(12) United States Patent
Blum et al.

(10) Patent No.: US 10,344,788 B2
(45) Date of Patent: Jul. 9, 2019

(54) DEVICE FOR ANCHORING AT LEAST ONE FASTENING ELEMENT IN A LAMINATE STRUCTURE HAVING AT LEAST TWO LAYERS

(71) Applicant: A. RAYMOND ET CIE, Grenoble (FR)

(72) Inventors: Sebastian Blum, Endingen (DE); Till Eric Ruffing, Grenzach-Wyhlen (DE); Martin Büsch, Efringen-Kirchen (DE); Martin Kurth, Kandern (DE); Johannes Gebhardt, Stutensee (DE)

(73) Assignee: A. RAYMOND ET CIE, Grenoble (FR)

( * ) Notice: Subject to any disclaimer, the term of this patent is extended or adjusted under 35 U.S.C. 154(b) by 106 days.

(21) Appl. No.: 15/124,015

(22) PCT Filed: Mar. 18, 2015

(86) PCT No.: PCT/EP2015/055598
§ 371 (c)(1),
(2) Date: Sep. 6, 2016

(87) PCT Pub. No.: WO2015/140190
PCT Pub. Date: Sep. 24, 2015

(65) Prior Publication Data
US 2017/0159690 A1    Jun. 8, 2017

(30) Foreign Application Priority Data
Mar. 21, 2014  (DE) .................. 10 2014 103 947

(51) Int. Cl.
*E04D 5/00* (2006.01)
*F16B 11/00* (2006.01)
(Continued)

(52) U.S. Cl.
CPC .............. *F16B 11/006* (2013.01); *E04C 3/14* (2013.01); *F16B 11/00* (2013.01); *F16B 37/02* (2013.01);
(Continued)

(58) Field of Classification Search
CPC . E04D 5/14; E04D 5/142; E04D 5/145; F16B 43/00; F16B 11/00
See application file for complete search history.

(56) References Cited

U.S. PATENT DOCUMENTS

| 3,640,327 A |   | 2/1972 | Burt |   |
|---|---|---|---|---|
| 4,467,581 A | * | 8/1984 | Francovitch | ............ E04D 5/145 411/542 |

(Continued)

FOREIGN PATENT DOCUMENTS

| AT | 512705 A1 | 10/2013 |
| CN | 202 431 698 | 9/2012 |

(Continued)

OTHER PUBLICATIONS

International Search Report dated Jun. 15, 2015 in PCT/EP2015/055598.
(Continued)

*Primary Examiner* — Gisele D Ford
(74) *Attorney, Agent, or Firm* — LeClairRyan

(57) ABSTRACT

A device for anchoring at least one fastening element in a laminate structure having at least two layers comprises a fastening element, and a carrier assembly on which the fastening element is mounted. The carrier assembly is designed with a protruding rib structure which radially outwardly surrounds the fastening element, resulting in a transmission of force into the laminate structure that is conducive to long-term stability of the anchoring.

19 Claims, 38 Drawing Sheets

(51) Int. Cl.
    *F16B 37/02*     (2006.01)
    *F16B 37/04*     (2006.01)
    *E04C 3/14*     (2006.01)

(52) U.S. Cl.
    CPC ............ *F16B 37/04* (2013.01); *F16B 37/042* (2013.01); *F16B 37/048* (2013.01)

(56) References Cited

U.S. PATENT DOCUMENTS

| | | | |
|---|---|---|---|
| 4,476,660 A * | 10/1984 | Francovitch | E04D 5/145 405/259.1 |
| 4,520,606 A * | 6/1985 | Francovitch | E04D 5/143 411/531 |
| 4,744,187 A * | 5/1988 | Tripp | E04D 5/143 411/179 |
| 4,747,241 A * | 5/1988 | Whitman | E04D 5/143 411/258 |
| 4,751,802 A * | 6/1988 | Whitman | E04D 5/148 52/410 |
| 4,826,374 A | 5/1989 | Baglin | |
| 4,945,699 A * | 8/1990 | Murphy | E04D 5/142 52/410 |
| 5,102,275 A * | 4/1992 | Hulsey | E04D 3/3603 411/134 |
| 5,139,379 A * | 8/1992 | Hasan | E04D 3/3603 411/368 |
| 5,193,868 A | 3/1993 | O'Toole | |
| 5,204,148 A * | 4/1993 | Alexander | E04D 5/145 428/141 |
| 5,267,423 A * | 12/1993 | Giannuzzi | E04D 3/3603 411/387.5 |
| 5,385,433 A * | 1/1995 | Calandra, Jr. | E21D 11/006 405/259.1 |
| 5,797,232 A * | 8/1998 | Larson | E04D 5/142 411/147 |
| 5,803,693 A * | 9/1998 | Choiniere | E04D 5/145 405/302.1 |
| 5,876,084 A | 3/1999 | Smith et al. | |
| 5,915,903 A * | 6/1999 | Osterle | E04D 3/3603 411/160 |
| 5,930,969 A * | 8/1999 | Mayle | E04D 5/142 52/410 |
| 5,934,855 A * | 8/1999 | Osterle | E04D 3/3603 405/302.1 |
| 5,951,225 A * | 9/1999 | Osterle | E04D 3/3603 411/531 |
| 6,205,730 B1 * | 3/2001 | Hasan | E04D 5/145 411/147 |
| 6,233,889 B1 * | 5/2001 | Hulsey | E04D 3/3603 411/533 |
| 6,250,034 B1 * | 6/2001 | Hulsey | E04D 3/3603 411/545 |
| 6,640,511 B1 * | 11/2003 | Link | E04D 3/3603 52/410 |
| 6,665,991 B2 | 12/2003 | Hasan | |
| 9,121,545 B2 * | 9/2015 | Stanley | F16M 13/022 |
| 2003/0033780 A1 * | 2/2003 | Hasan | E04D 5/14 52/410 |
| 2003/0107218 A1 | 6/2003 | Anderson et al. | |
| 2003/0126816 A1 * | 7/2003 | Hasan | E04D 5/142 52/409 |
| 2004/0040243 A1 * | 3/2004 | Yaros | E04D 5/142 52/410 |
| 2004/0052607 A1 | 3/2004 | Johnson et al. | |
| 2005/0166503 A1 * | 8/2005 | Panasik | E04D 5/143 52/408 |
| 2008/0251196 A1 | 10/2008 | Stumpf et al. | |
| 2009/0173028 A1 * | 7/2009 | Garrigus | E04D 5/142 52/410 |
| 2010/0031595 A1 * | 2/2010 | Kelly | E04D 5/143 52/408 |
| 2010/0326006 A1 * | 12/2010 | Yaros | E04D 5/145 52/711 |
| 2012/0017529 A1 * | 1/2012 | Shadwell | E04D 5/145 52/410 |
| 2012/0037770 A1 | 2/2012 | Chen et al. | |

FOREIGN PATENT DOCUMENTS

| | | |
|---|---|---|
| DE | 4342261 A1 | 6/1995 |
| DE | 10305015 A1 | 9/2004 |
| DE | 1 980 757 | 10/2008 |
| DE | 102007016851 A1 | 10/2008 |
| DE | 102013201058 A1 | 7/2014 |
| DE | 102013220718 A1 | 4/2015 |
| EP | 1 223 355 | 7/2002 |
| EP | 1 980 757 | 10/2008 |
| FR | 2 606 471 | 5/1988 |
| FR | 2 730 771 | 8/1996 |
| FR | 2 968 369 | 6/2012 |
| GB | 1 096 812 | 12/1967 |
| GB | 1096812 A | 12/1967 |
| TW | 201 314 058 | 4/2013 |

OTHER PUBLICATIONS

International Preliminary Report of Patentability dated Sep. 21, 2016 in PCT/EP2015/055598.

European Official Communication and Translation dated Sep. 27, 2018, and Cited References issued in parallel European Patent Application No. 15 711 129.5-1010.

Japanese Patent Office Notice of Grounds for Rejection and Translation dated Nov. 6, 2018 in parallel Japanese Patent Application No. 2017-555817.

\* cited by examiner

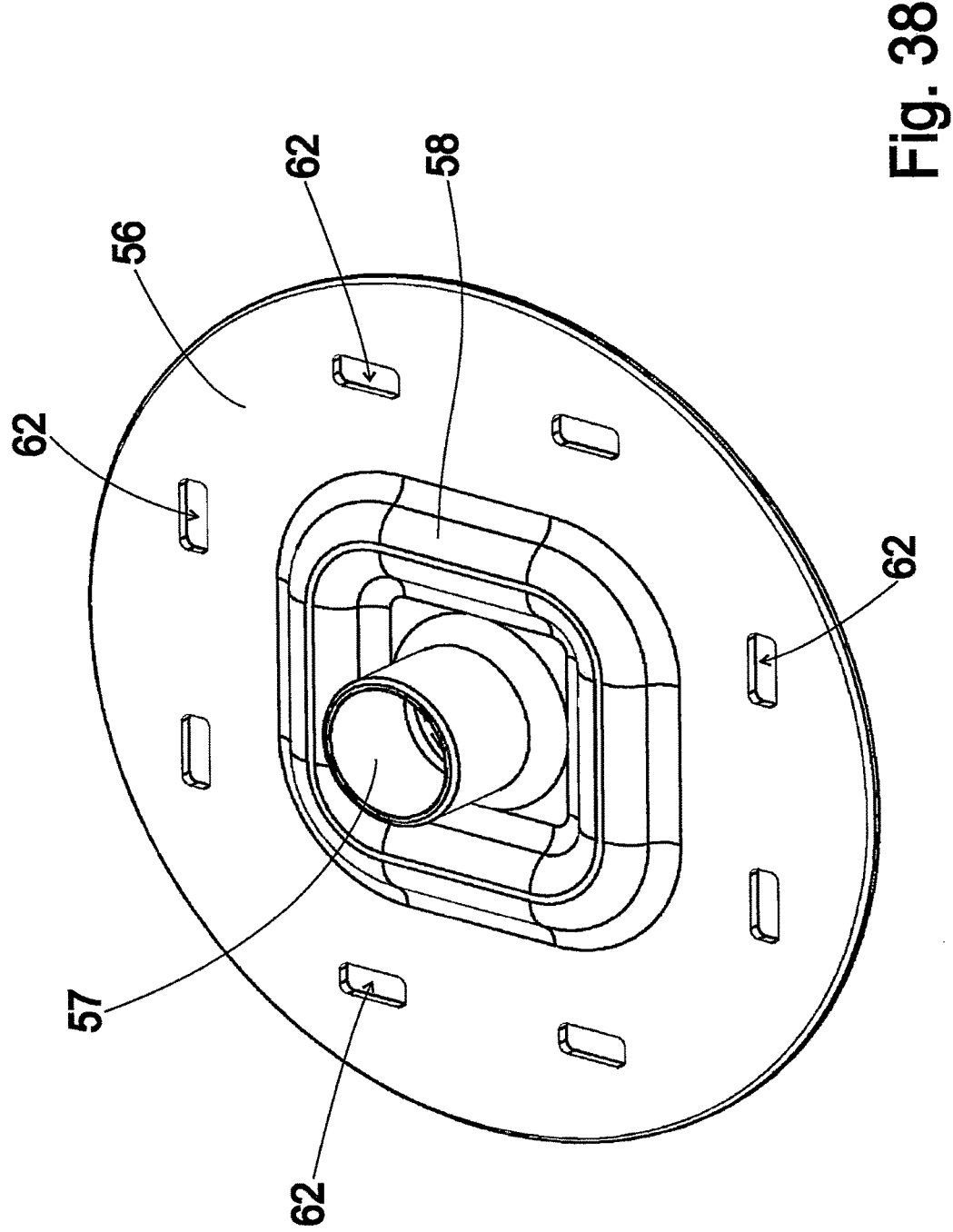

DEVICE FOR ANCHORING AT LEAST ONE FASTENING ELEMENT IN A LAMINATE STRUCTURE HAVING AT LEAST TWO LAYERS

CROSS-REFERENCE TO RELATED APPLICATIONS

This application U.S. National Phase Patent Application based on International Application Serial No. PCT/EP2015/055598 filed Mar. 21, 2014, the disclosure of which is hereby explicitly incorporated by reference herein.

BACKGROUND OF THE INVENTION

1. Field of the Invention

The present invention relates to to a device for anchoring at least one fastening element in a laminate structure having at least two layers.

2. Description of the Related Art

A device of this type is known from GB 1,096,812 A. The previously known device for anchoring at least one elongated fastening element, designed as a bolt, in a laminate structure having two layers has a support plate, designed with stamped projections, as a carrier assembly which is connected to the fastening element without play and configured for arrangement between the two layers of the laminate structure.

The present invention provides a corrugated plate for fastening roofing decking membranes is known from U.S. Pat. No. 6,665,991 B2, having a number of circumferential corrugated rings situated concentrically around a central hole which is provided for passing a loose screw through.

SUMMARY OF THE INVENTION

The present invention provides a device of the type mentioned at the outset, which is characterized by relatively high stability during anchoring of the, or each, fastening element.

As a result of the carrier assembly according to the invention having a protruding rib structure which radially outwardly surrounds, at least in sections, the, or at least one, elongated fastening element in the circumferential direction, i.e., with a component at an angle relative to a radial direction predefined by a fastening element, the relatively high bending strength of the carrier assembly in the area of the, or each, fastening element surrounded by the rib structure results in high anchoring stability.

In one form thereof, the present invention provides a device for anchoring at least one fastening element extending in a longitudinal direction, in a laminate structure having at least two layers, with a carrier assembly to which the fastening element is connected without play and which is configured for arrangement between two layers of the laminate structure, characterized in that the carrier assembly has a protruding rib structure, which radially outwardly surrounds, at least in sections, the, or at least one, fastening element in the circumferential direction.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 38 shows in a perspective view an outer plate of the fourth exemplary embodiment according to FIG. 36.

Figure 1:
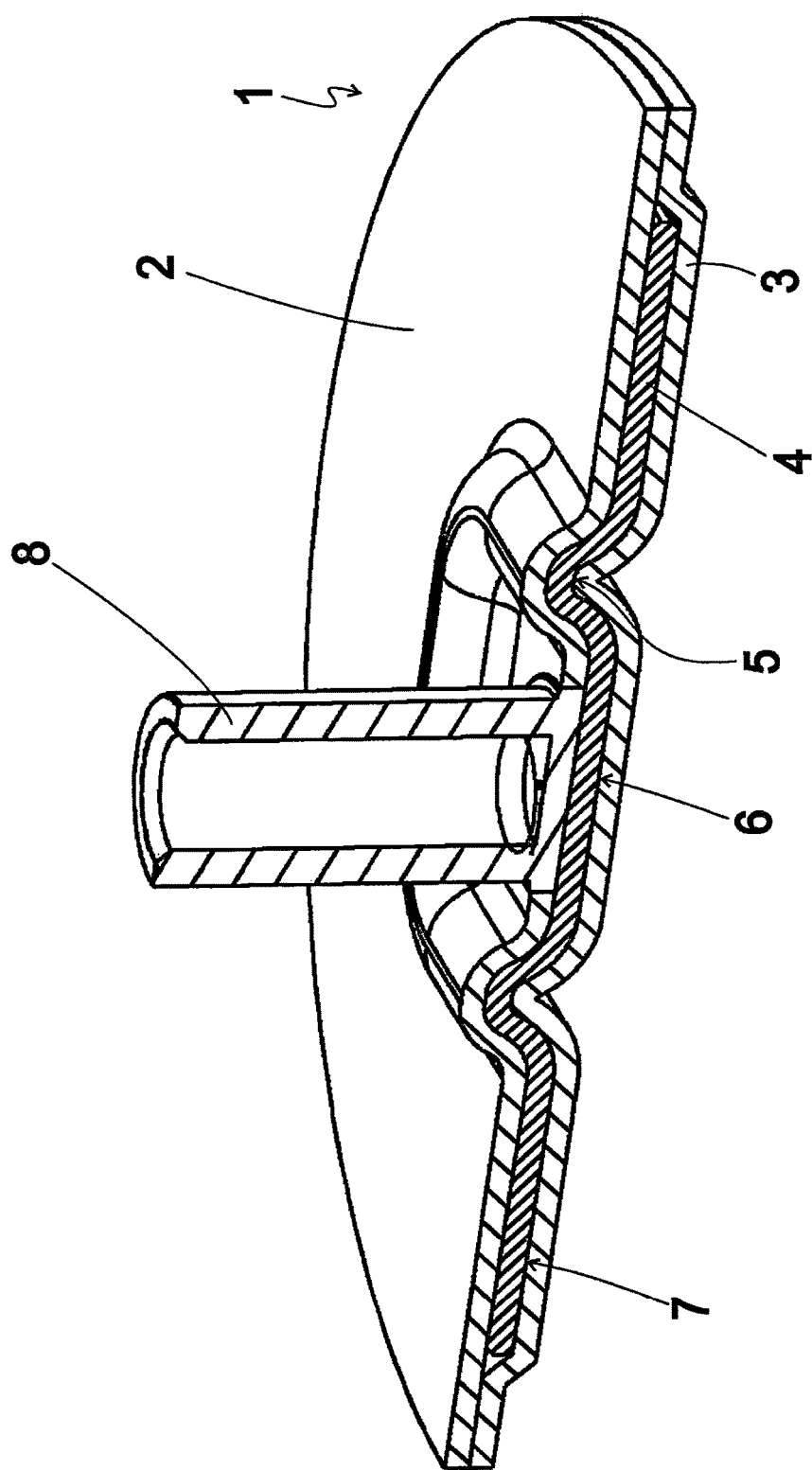
FIG. 1 shows in a sectional perspective view a first exemplary embodiment of a device according to the invention which is anchored in a laminate structure.

Corresponding reference characters indicate corresponding parts throughout the several views. Although the exemplifications set out herein illustrate embodiments of the invention, the embodiments disclosed below are not intended to be exhaustive or to be construed as limiting the scope of the invention to the precise forms disclosed.

DETAILED DESCRIPTION

FIG. 1 shows in a sectional perspective view a laminate structure 1 which has a first laminate cover layer 2 and a second laminate cover layer 3. The laminate cover layers 2, 3 are woven glass fiber or carbon fiber mats, for example, which have been impregnated with a resin that has been subsequently cured in order to form the laminate structure 1.

FIG. 1 also illustrates a first exemplary embodiment of a device according to the invention, which as a carrier assembly has a base plate 4 situated between the laminate cover layers 2, 3. In the first exemplary embodiment, the base plate 4 is formed with an arched rib 5 as a rib structure, which has a circumferentially closed design around a central area. The rib 5 is situated between a centrally located inner section 6 and an outer section 7 situated on the radially outward side of the inner section 6, and on one side of the base plate 4 is elevated across a plane in which both the inner section 6 and the outer section 7 are situated. In the first exemplary embodiment illustrated in FIG. 1, the rib 5 has a rounded arched design over the inner section 6 and the outer section 7.

It is also apparent from the illustration according to FIG. 1 that in the inner section 6, a cylindrical fastening bolt 8, which is radially outwardly surrounded by the rib 5, is mounted, advantageously in a fixed manner, on the base plate 4 without play as a fastening element, which extends in a longitudinal direction. The fastening bolt 8 protrudes, in the same direction as the rib 5, beyond the inner section 6 and beyond the outer section 7 of the base plate 4, and either has a smooth-walled design or is provided with an external thread. In the first exemplary embodiment illustrated in FIG. 1, the fastening bolt 8 passes through the first laminate cover layer 2, which is situated on the side of the base plate 4 containing the elevated portion of the rib 5.

It is also apparent from the illustration according to FIG. 1 that the laminate cover layers 2, 3 adjoin one another on the radially outer side of the outer section 7 of the base plate 4, and during formation of the laminate structure 1 are fixedly joined together, while in the area of the base plate 4 they cover the outer sides of the base plate 4 with a positive fit, so that the base plate 4, and thus also the fastening bolt 8 which is fixedly connected to the base plate 4, are anchored in the laminate structure 1 or connected thereto, essentially without play.

Figure 2:
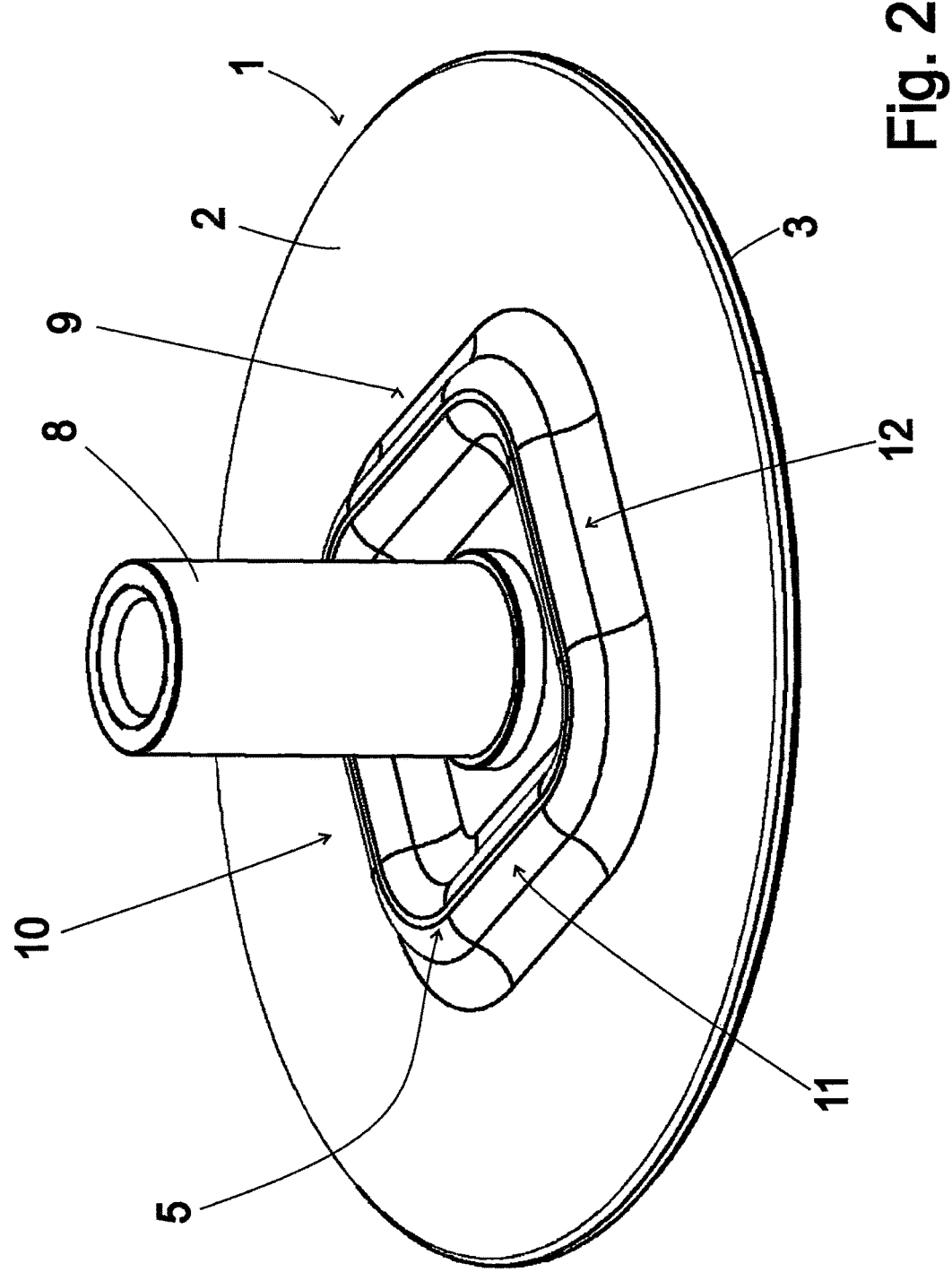
FIG. 2 shows in a perspective view the first exemplary embodiment anchored in a laminate structure.

FIG. 2 shows in a top view the first exemplary embodiment according to FIG. 1. It is apparent from FIG. 2 that in this exemplary embodiment the rib 5 is formed from four straight rib sections 9, 10, 11, 12 of equal length, which in the circumferential direction, i.e., at an angle relative to a radial direction determined by the centrally situated fastening bolt 8, are oriented in pairs at right angles to one another, abut one another in rounded corner areas, and enclose the fastening bolt 8 with a basic square shape in the manner of a cage.

The design of the rib structure formed by the rib 5 results in high bending strength of the base plate 4, thus also achieving a relatively uniform transmission of forces, in particular bending forces acting on the fastening bolt 8, into the laminate structure 1. For this purpose, the rib 6 is oriented in a so-called 0 degree/90 degree cross ply of the laminate structure 1 in parallel or at right angles to the fiber direction of the laminate cover layer 2, 3. The advantageous distribution of rigidity results in higher rigidity in the center in order to avoid detachment of the laminate cover layer 3 facing away from the fastening bolt, and results in lower rigidity at the outer edge, so that on account of flexibility, delamination is prevented.

Figure 3:
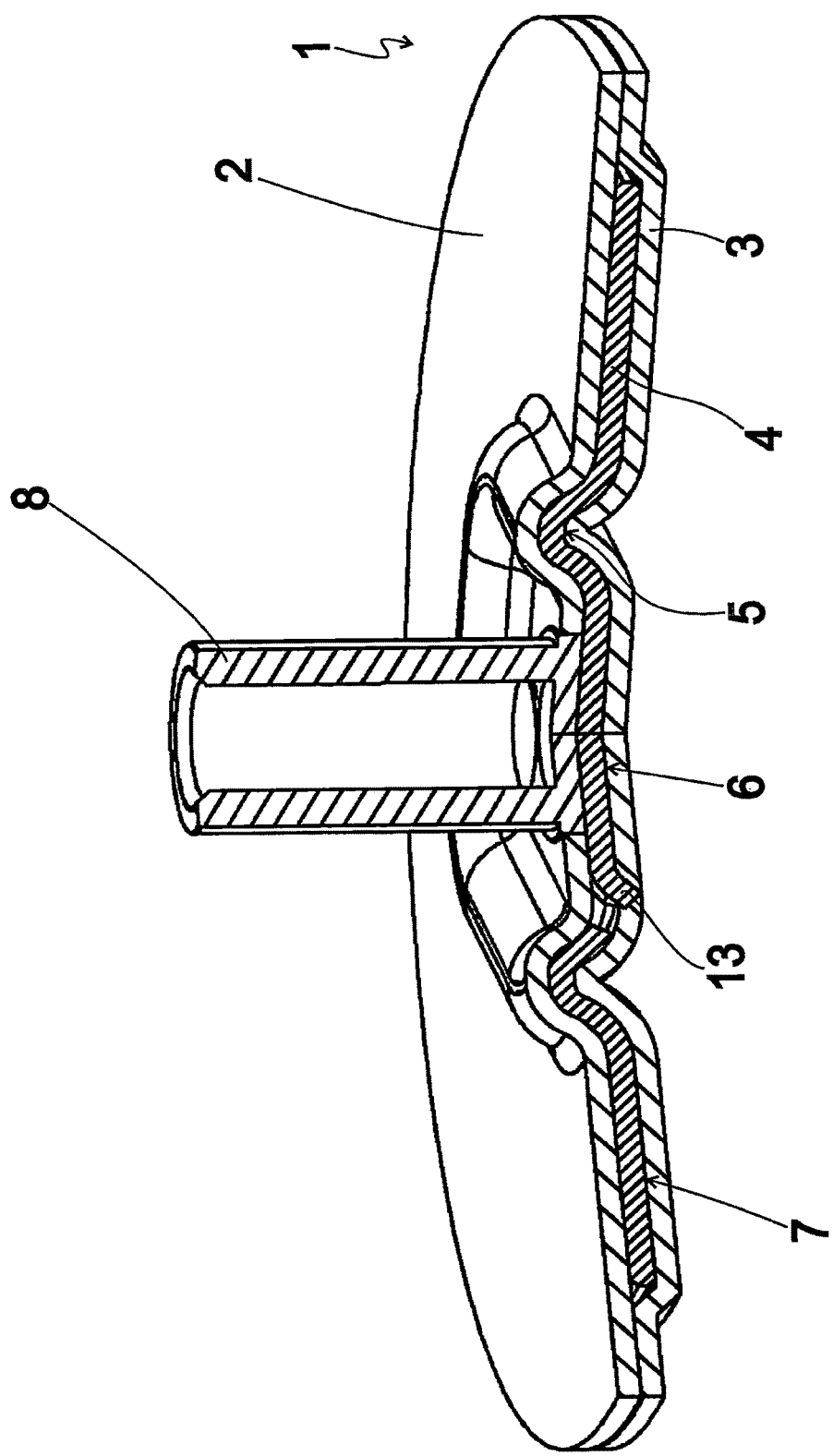
FIG. 3 shows in a sectional perspective view a first refinement of the first exemplary embodiment anchored in a laminate structure.

FIG. 3 shows in a perspective view a refinement of the first exemplary embodiment anchored in a laminate structure 1; in the first refinement of the first exemplary embodiment and in the first exemplary embodiment itself, mutually corresponding elements are provided with the same reference numerals and are not explained in greater detail below. In the first modification of the first exemplary embodiment according to FIG. 3, a number of straight flared tongues 13 are formed in the transition area from the inner section 6 and the rib 5, which extend radially outwardly from the inner section 6 and protrude beyond the inner section 6 on the side of the base plate 4 facing away from the rib 5. The straight flared tongues 13 engage with the second laminate cover layer 3 situated on this side of the base plate 4, thus increasing the adhesiveness and also ensuring that the base plate 4 in particular is then stable against lateral shifting in the event that detachment occurs in areas between the base plate 4 and the laminate cover layers 2, 3, or the connection between the laminate cover layers 2, 3 in the edge area of the base plate 4 is no longer sufficiently stable.

The flared tongues 13 also ensure prefixing of the device according to the invention on a textile preform layer as a subsequent laminate structure 1, so that during transport, the device together with a preform remains fixed in a mold, and during the subsequent impregnation with resin in the mold, remains fixed in position on the laminate structure 1. This correspondingly applies for all analogous exemplary embodiments and modifications.

Figure 4:
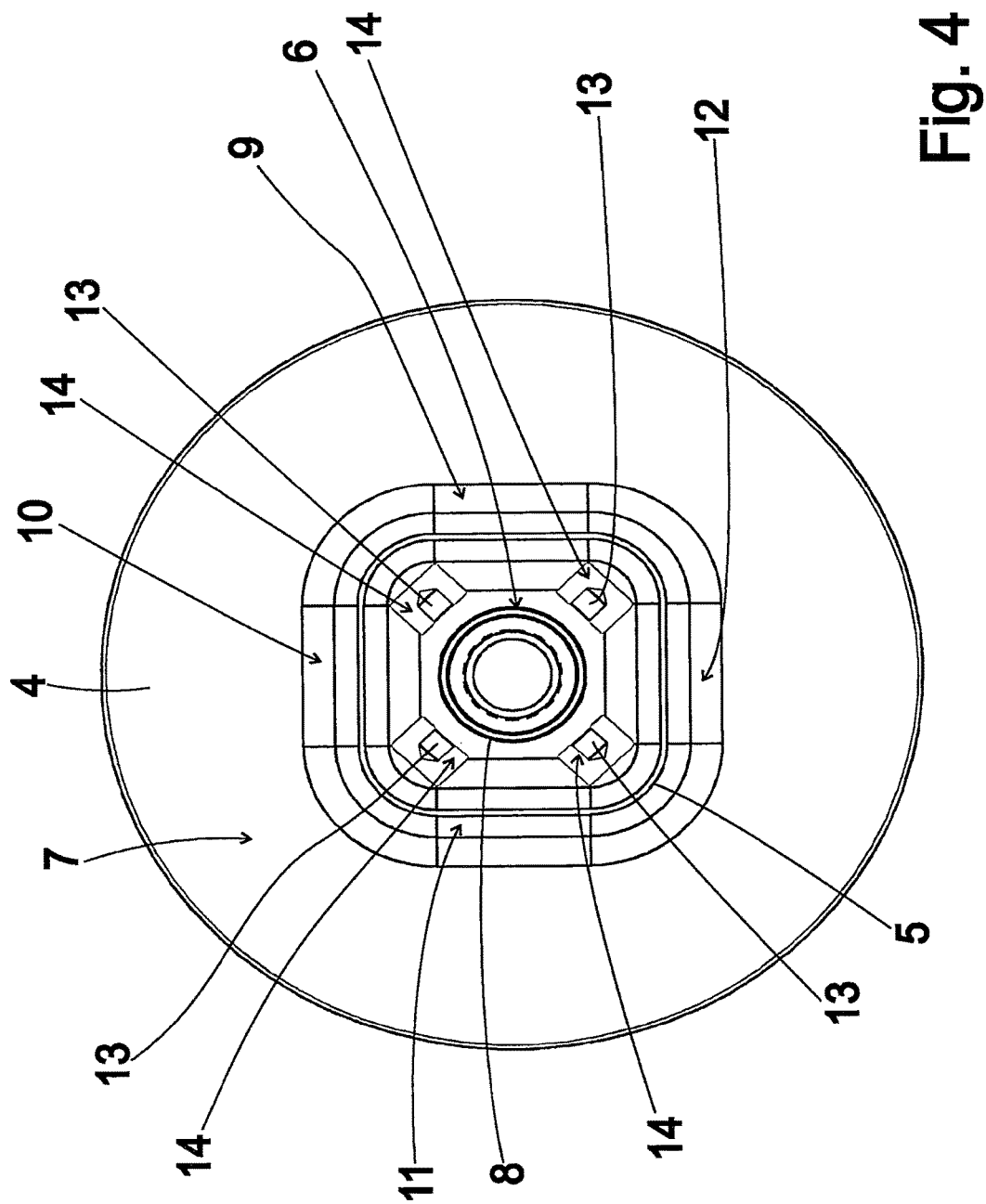
FIG. 4 shows in a top view the exposed first refinement of the first exemplary embodiment according to FIG. 3.

FIG. 4 shows in a top view the exposed first refinement of the first exemplary embodiment according to FIG. 3. It is apparent from FIG. 4 that the straight flared tongues 13 are situated in the rounded corner areas of the rib 5, and lie in tongue recesses 14 formed in the base plate 4. It is also apparent from the illustration according to FIG. 4 that the base plate 4 in the first refinement of the first exemplary embodiment and the first exemplary embodiment itself according to FIG. 1 have a circular design.

Figure 5:
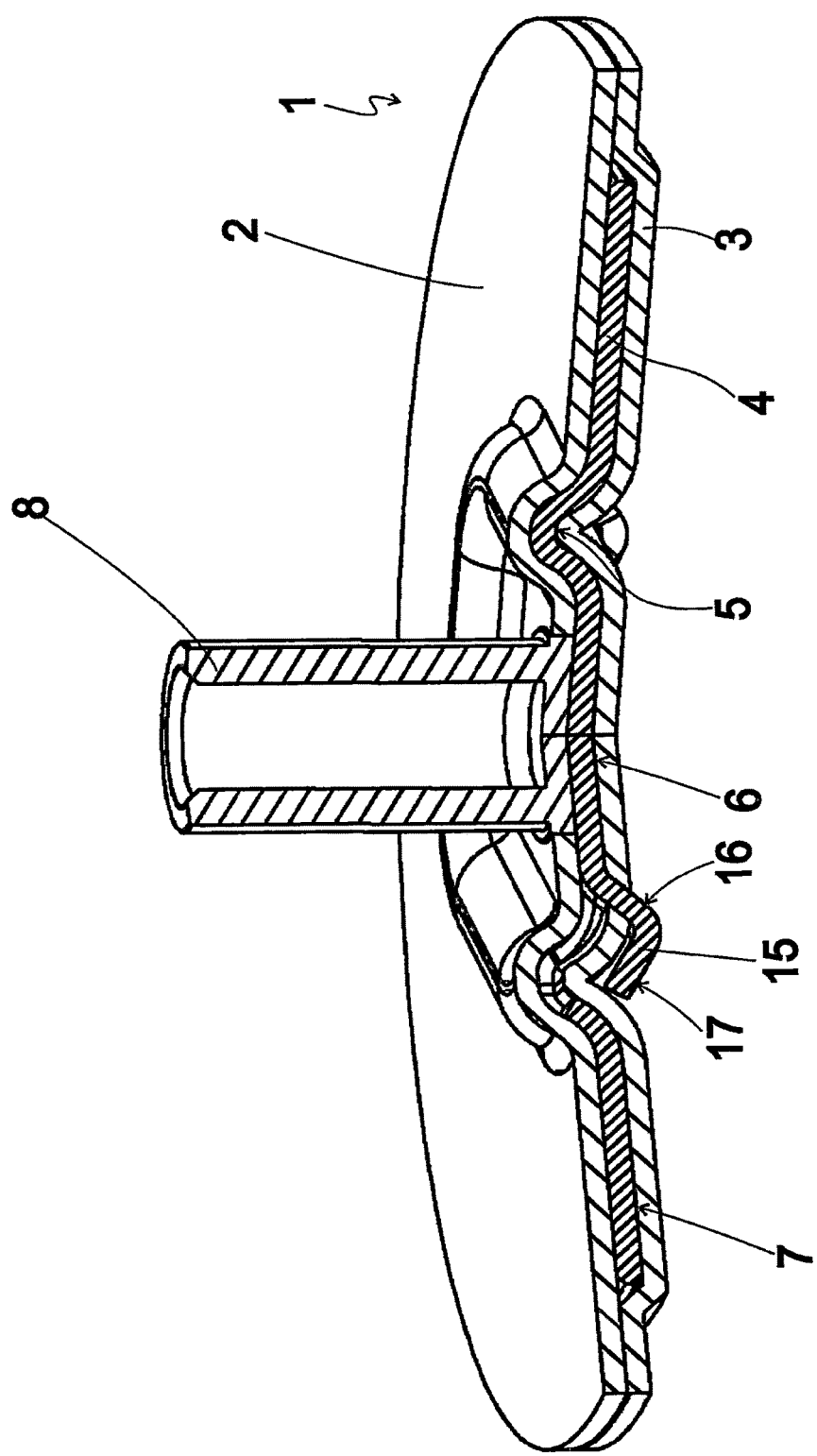
FIG. 5 shows in a perspective view a second refinement of the first exemplary embodiment anchored in a laminate structure.

FIG. 5 shows in a perspective view a second refinement of the first exemplary embodiment anchored in a laminate structure 1; in the second refinement of the first exemplary embodiment and in the first refinement of the first exemplary embodiment, as well as in the first exemplary embodiment itself, mutually corresponding elements are provided with the same reference numerals and are not explained in greater detail below. In the second refinement of the first exemplary embodiment according to FIG. 5, a number of angled flared tongues 15 are present, which extend radially outwardly from the inner section 6 into a vertex, which has its highest elevation across the inner section 6 and the outer section 7, and protrude, opposite from the rib 5, beyond the plane in which the inner section 6 and the outer section 7 are situated. The angled flared tongues 15 each have a flared section 16 connected to the inner section 6, and an end section 17, which is situated on the side of the flared section 16 facing away from the inner section 6 and bent back with respect to the flared section 16 in the direction of the rib 5, and rests on the outer side of the second laminate cover layer 3.

Figure 6:
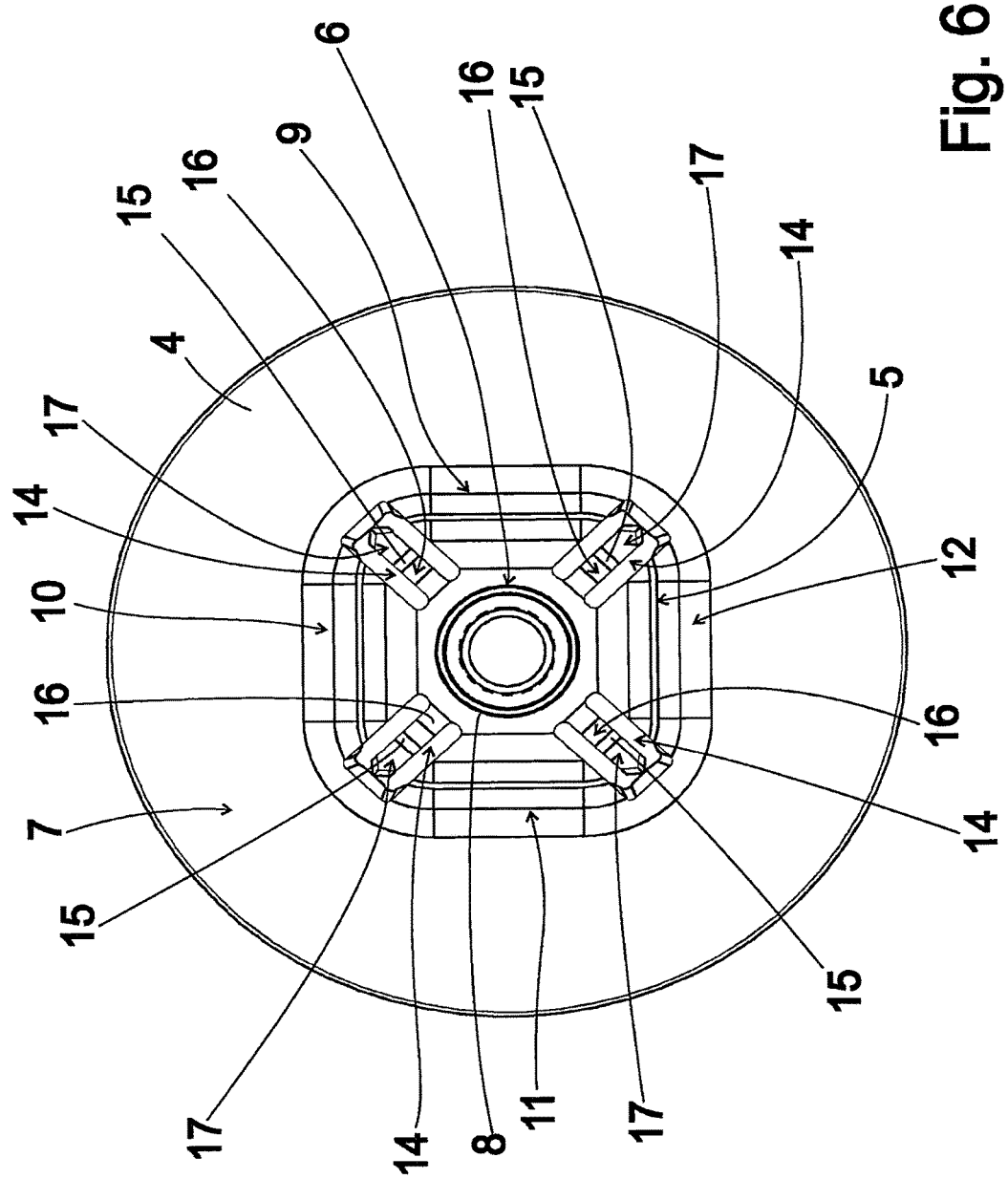
FIG. 6 shows in a top view the exposed second refinement of the first exemplary embodiment according to FIG. 5.

FIG. 6 shows in a top view the exposed second refinement of the first exemplary embodiment according to FIG. 5. It is apparent from the illustration according to FIG. 6 that, like the the straight flared tongues 13 in the first refinement of the first exemplary embodiment, the angled flared tongues 15 also extend radially outwardly from the inner section 6, and are situated in the corner areas of the rib 5 in tongue recesses 14 which extend across the vertex of the rib 5. The rib 5 is thus interrupted in sections in the radial direction, so that rigidity peaks, which would otherwise be present in the corner areas, are reduced.

Figure 7:
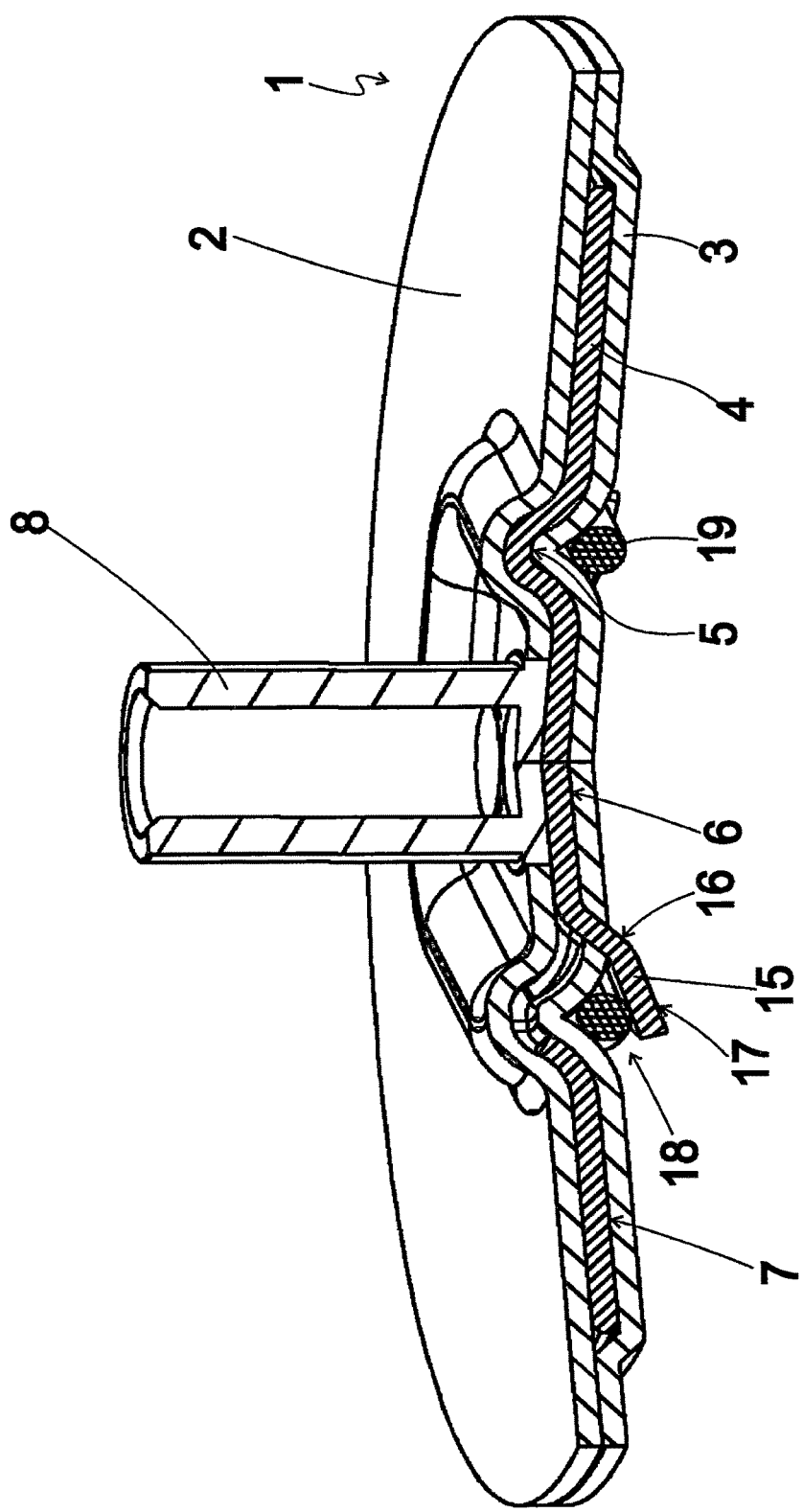
FIG. 7 shows in a perspective view a third refinement of the first exemplary embodiment anchored in a laminate structure.

FIG. 7 shows in a sectional perspective view a third refinement of the first exemplary embodiment anchored in a laminate structure 1; in the third refinement of the first exemplary embodiment and in the refinements of the first exemplary embodiment explained above as well as in the first exemplary embodiment itself, mutually corresponding elements are provided with the same reference numerals and are not explained in greater detail below. The third refinement of the first exemplary embodiment according to FIG. 7 differs from the second refinement of the first exemplary embodiment essentially in that the end section 17 is not bent back with respect to the flared section 16 in the direction of the rib 5, but instead extends away from the plane in which the inner section 6 and the outer section 7 are situated, but with a flatter flare angle compared to the flare angle of the flared sections 16. A closed pressure ring 19 is situated in the free space thus formed between the rib 5 and the end sections 17 in the third refinement of the first exemplary embodiment, and engages behind the progression of the rib 5 following the second laminate cover layer 3, and in particular with appropriate pretensioning of the angled flared tongues 15, is conducive to the positive fit between the second laminate cover layer 3 and the rib 5, for example during curing.

Figure 8:
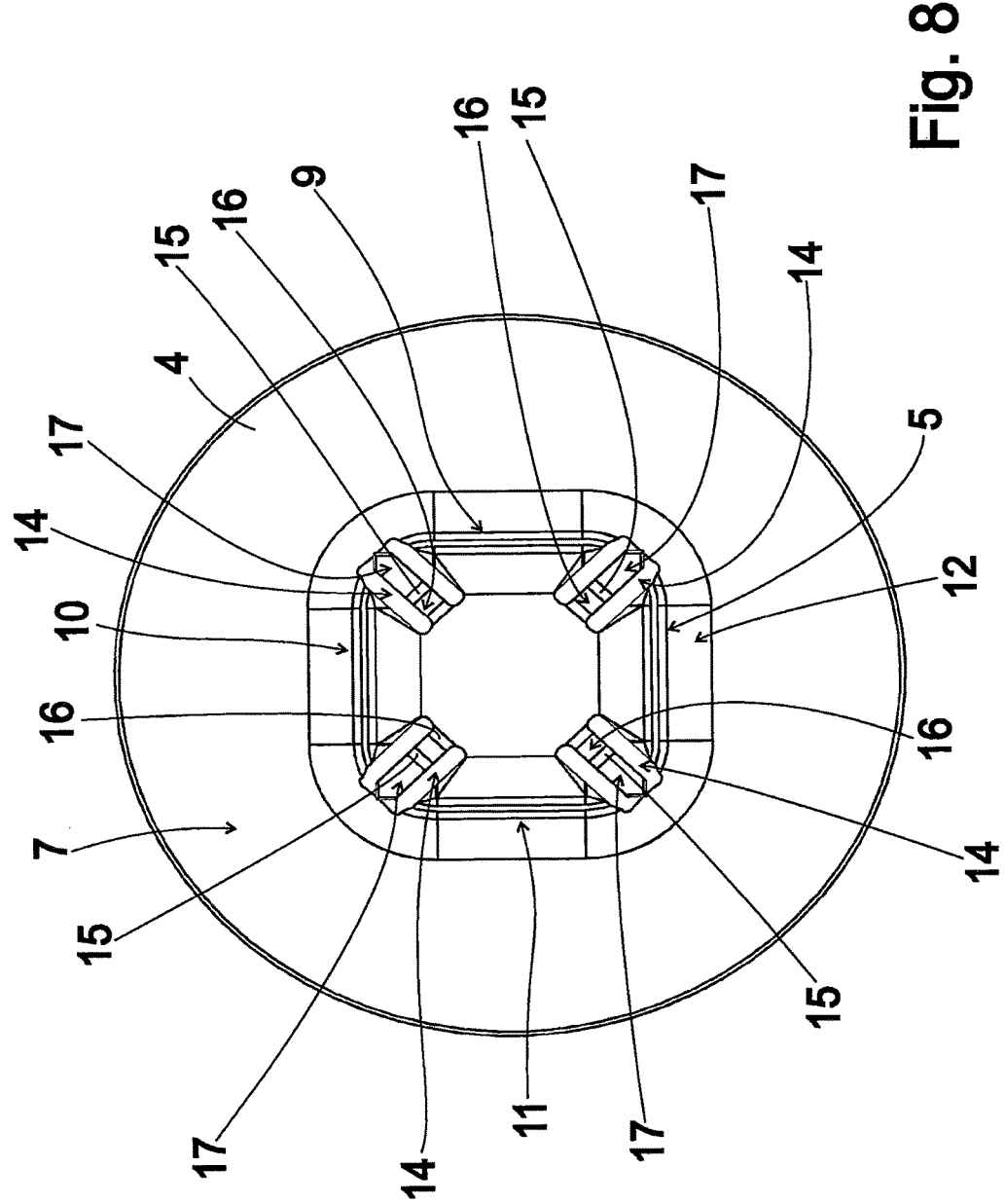
FIG. 8 shows, in a view from below, the exposed third refinement of the first exemplary embodiment according to FIG. 7.

FIG. 8 shows, in a view from below, the third refinement of the first exemplary embodiment according to FIG. 7, with the end sections 17 of the angled flared tongues 15 which extend beyond the vertex of the rib 5 situated in the corner areas of the rib 5, corresponding to the second refinement of the second exemplary embodiment.

Figure 9:
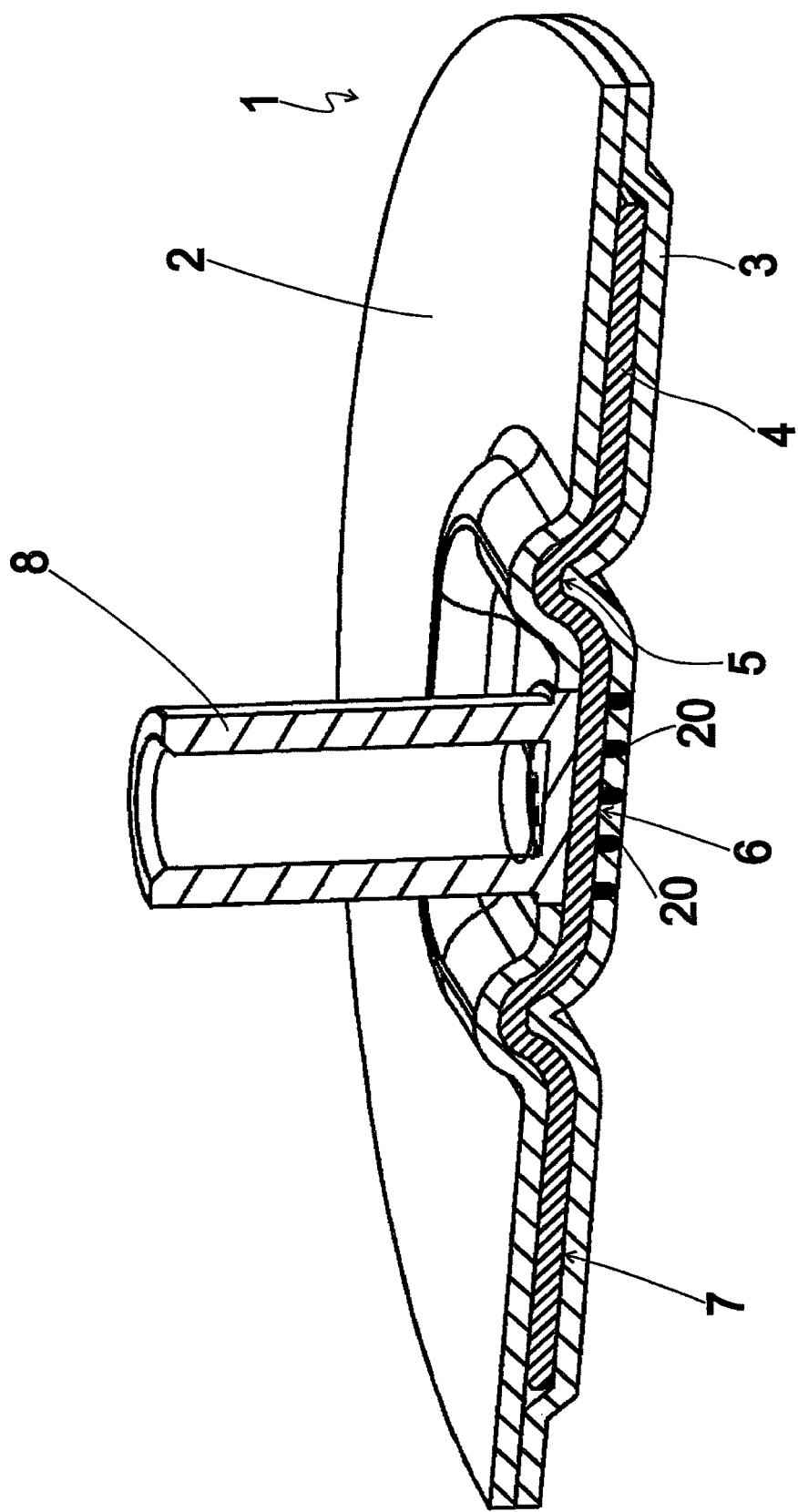
FIG. 9 shows in a perspective view a fourth refinement of the first exemplary embodiment anchored in a laminate structure.

FIG. 9 shows, in a perspective sectional view corresponding to FIG. 1, a fourth refinement of the first exemplary embodiment anchored in a laminate structure 1; in the fourth refinement of the first exemplary embodiment and in the refinements of the first exemplary embodiment explained above and in the first exemplary embodiment itself, mutually corresponding elements are provided with the same reference numerals and are not explained in greater detail below. In the fourth refinement of the first exemplary embodiment according to FIG. 9, the inner section 6 of the base plate 4 has engaging nubs 20, which protrude on the side facing away from the fastening bolt 8, and which in the illustration according to FIG. 9 engage in a claw-like manner with the second laminate cover layer 3 situated on this side of the base plate 4, and thus improve the connection between the inner section 6 and the second laminate cover layer 3, which is advantageous, in particular when the fastening bolt 8 is under heavy load.

Figure 10:
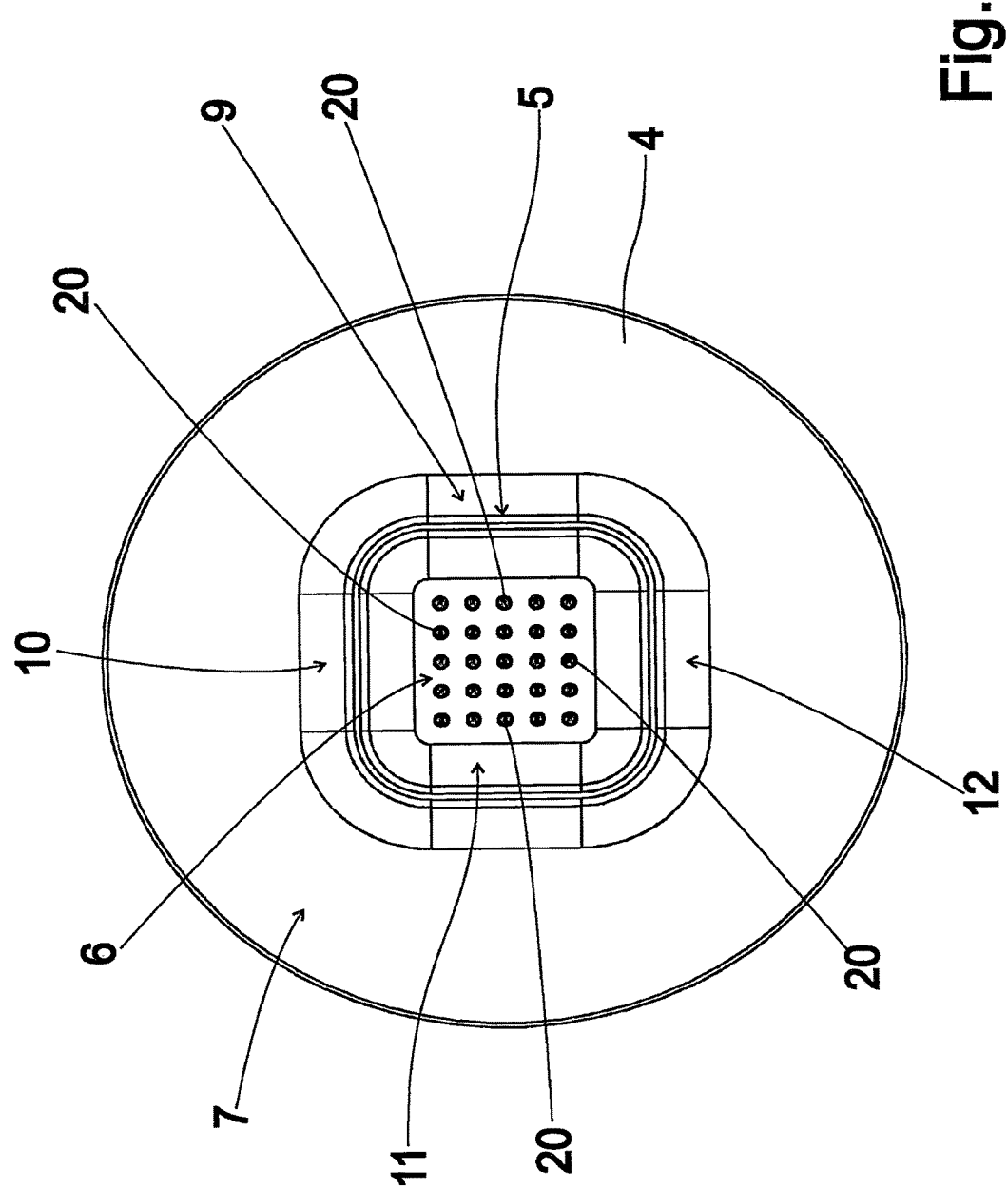
FIG. 10 shows, in a view from below, the exposed fourth refinement of the first exemplary embodiment according to FIG. 9.

FIG. 10 shows, in a view from below, the exposed fourth refinement of the first exemplary embodiment according to FIG. 9. It is apparent from FIG. 10 that in this refinement, the engaging nubs 20 are situated in the inner section 6 in a uniform checkered pattern at distances corresponding to the structural dimensions of the laminate structure 1.

Figure 11:
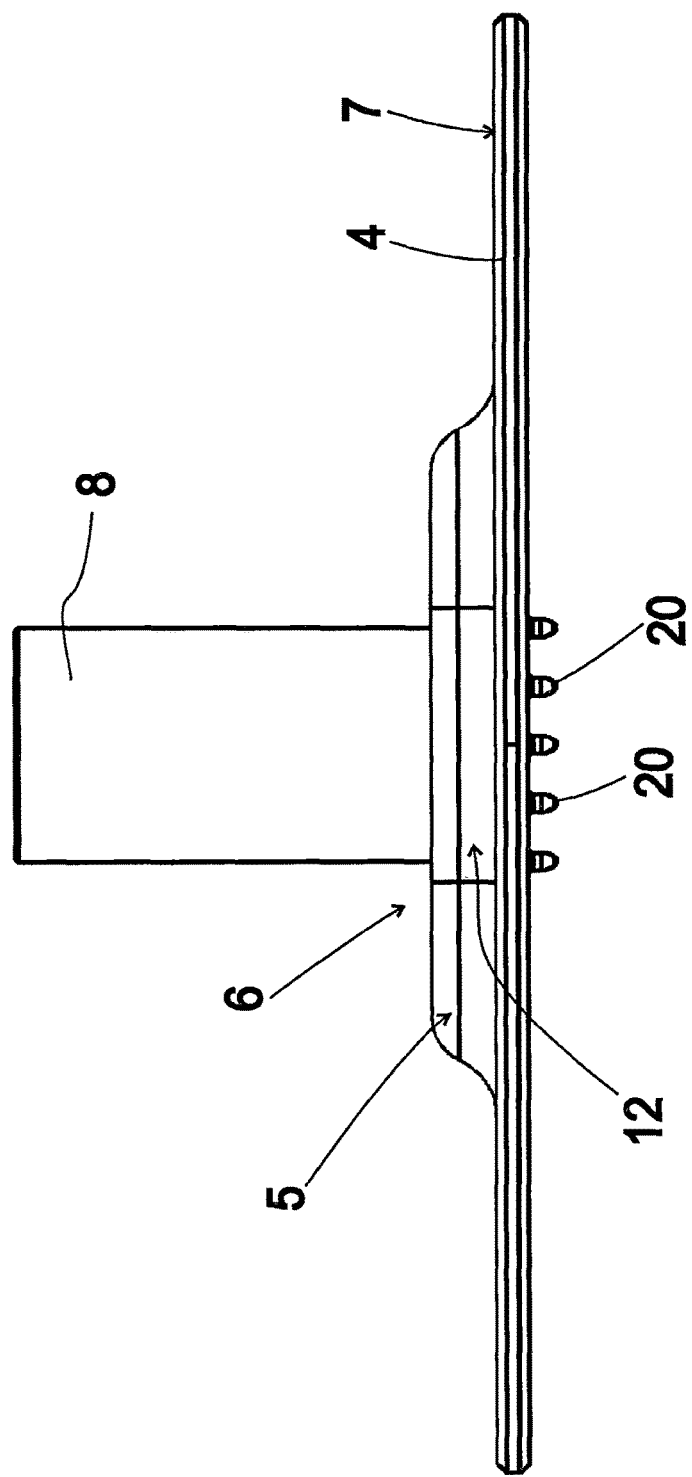
FIG. 11 shows in a side view the exposed fourth refinement of the first exemplary embodiment according to FIG. 9.

FIG. 11 shows in a side view the exposed fourth refinement of the first exemplary embodiment according to FIGS. 9 and 10, from which it is apparent that the engaging nubs 20 have been carved out of the base plate 4 by notch-like removal of a certain material thickness.

Figure 12:
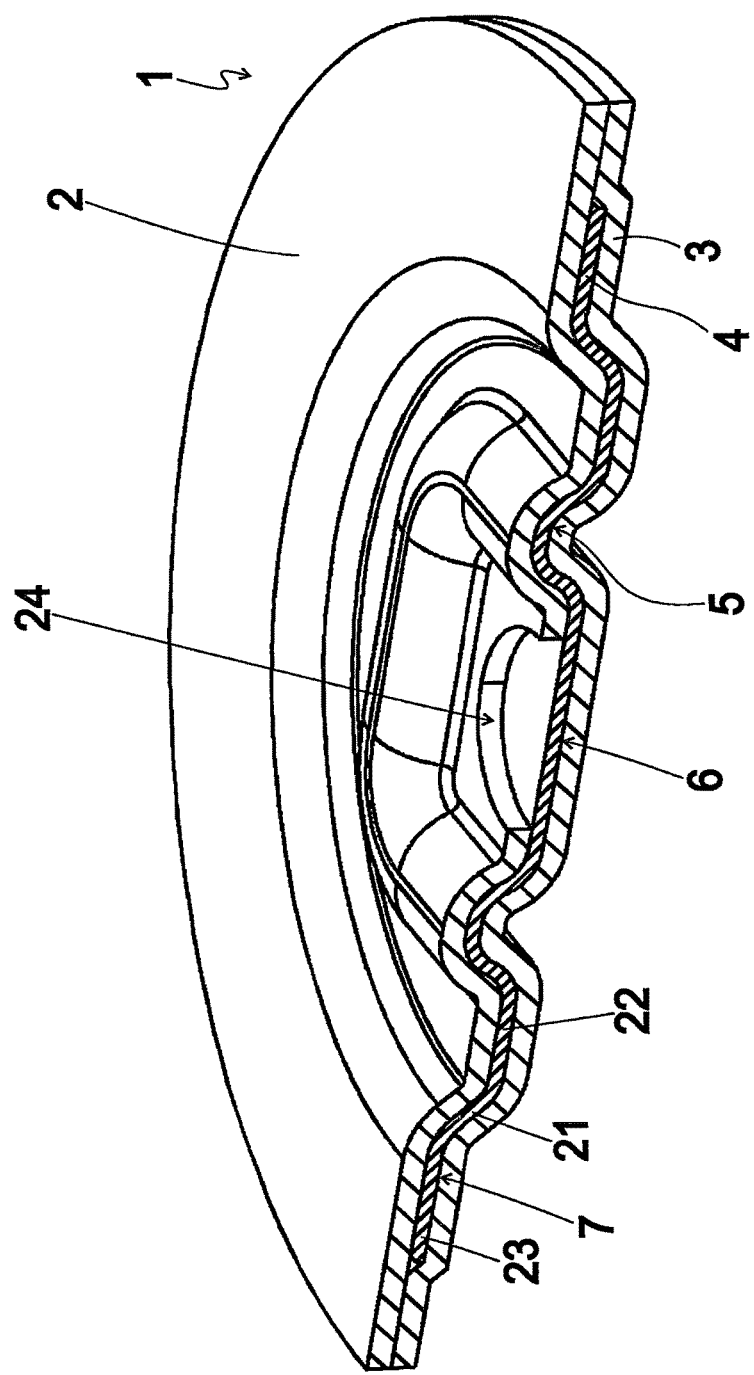
FIG. 12 shows in a perspective view a carrier assembly of a second exemplary embodiment of a device according to the invention, anchored in a laminate structure.

FIG. 12 shows, in a perspective view corresponding to FIG. 1, a carrier assembly, designed as a base plate 4, of a second exemplary embodiment of a device according to the invention anchored in a laminate structure 1; in the second exemplary embodiment according to FIG. 12 and in the first exemplary embodiment explained with reference to FIGS. 1 and 2, with associated refinements, mutually corresponding elements are provided with the same reference numerals and are not explained in greater detail below. The second exemplary embodiment according to FIG. 12, in addition to the rib 5 as a rib structure for improving the rigidity profile of the base plate 4 in the area of the outer section 7, has a reinforcing bevel 21, situated approximately in the middle between the rib 5 and the outer edge of the outer section 7, which divides the outer section 7 into an intermediate area 22 adjacent to the rib 5, and a radially outwardly situated edge area 23. The intermediate area 22 lies in the plane in which the inner section 6 of the base plate 4 is also situated, while the edge area 23, due to an inclined position of the reinforcing bevel 21 on the same side as the rib 5, lies in a plane with the vertex of the rib 5. It is also apparent from FIG. 12 that the first laminate cover layer 2 resting on the elevated area of the rib 5 has a fastening element recess 24 in the area of the inner section 6, through which a fastening element, not illustrated in FIG. 12, may pass unimpeded through the first laminate cover layer 2.

Figure 13:
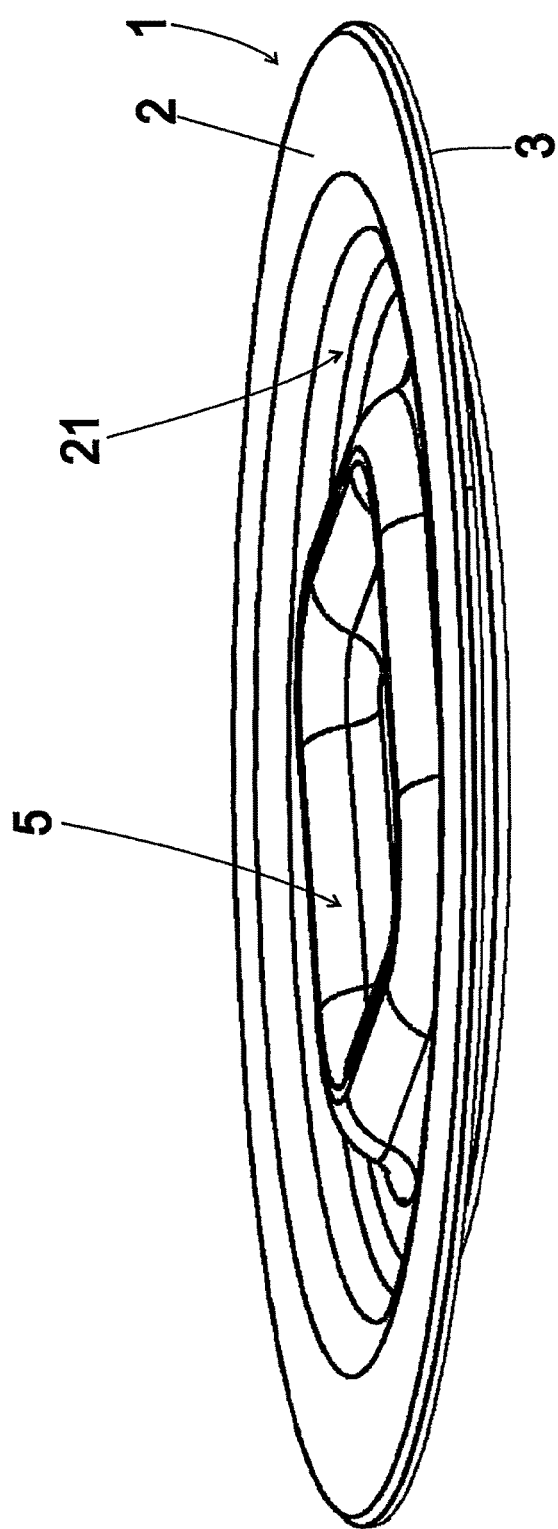
FIG. 13 shows in a perspective view the arrangement according to FIG. 12.

FIG. 13 shows in a perspective view the arrangement according to FIG. 12. It is apparent from FIG. 13 that in this exemplary embodiment, the reinforcing bevel 21 surrounds the rib 5, which has an essentially square perimeter, in a circle corresponding to the outer geometry of the base plate 4, which is likewise circular here.

Figure 14:
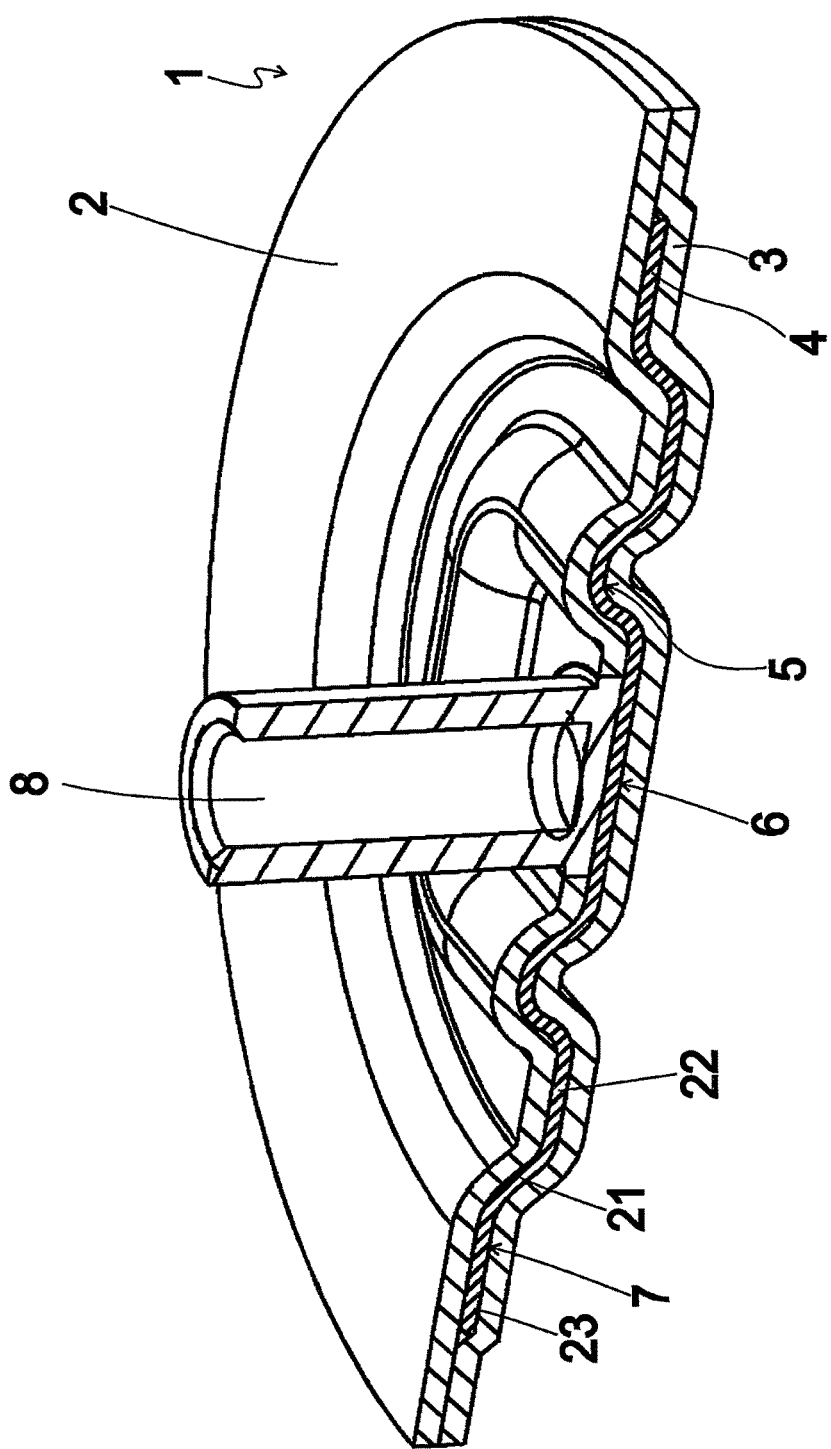
FIG. 14 shows in a sectional perspective view the second exemplary embodiment anchored in a laminate structure, with a bolt as a fastening element mounted on the carrier assembly.

FIG. 14 shows, in a sectional perspective view corresponding to FIG. 1, the second exemplary embodiment according to FIGS. 12 and 13 with a fastening bolt 8 as fastening element, which is fixedly mounted on the base plate 4 to form a device according to the invention.

The second exemplary embodiment is suited in particular for anchoring situations in which high bending forces act on a fastening element, such as a fastening bolt 8, which is surrounded by the rib 5.

Figure 15:
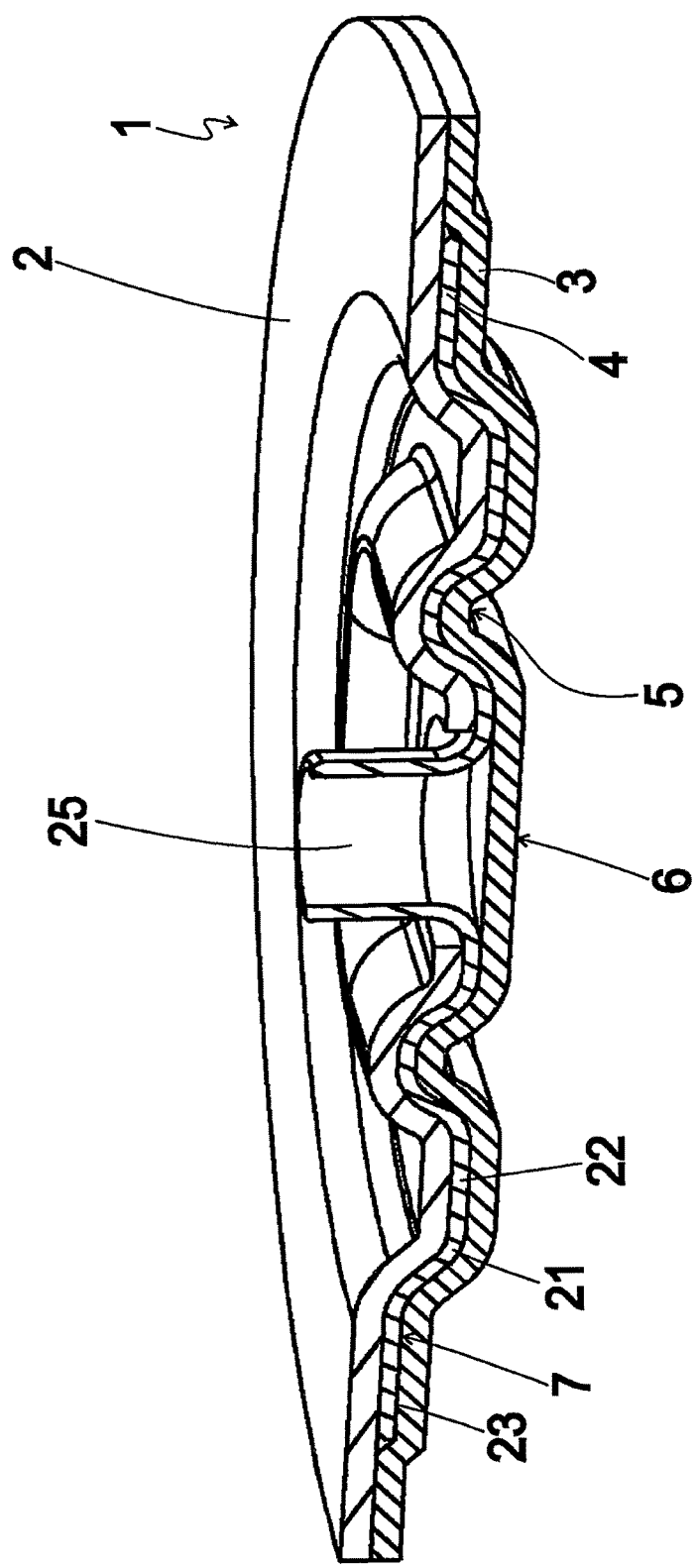
FIG. 15 shows in a perspective view a first modification of the second exemplary embodiment anchored in a laminate structure.

FIG. 15 shows in a sectional perspective view a first modification of the second exemplary embodiment explained with reference to FIGS. 12 to 14, having a reinforcing bevel 21 and anchored in a laminate structure 1, in the first modification according to FIG. 15 the fastening element being formed as a cylindrical flared sleeve 25 which is worked out in one piece from the inner section 6 of the base plate 4, and which extends beyond the vertex of the rib 5 in the axial direction.

Figure 16:
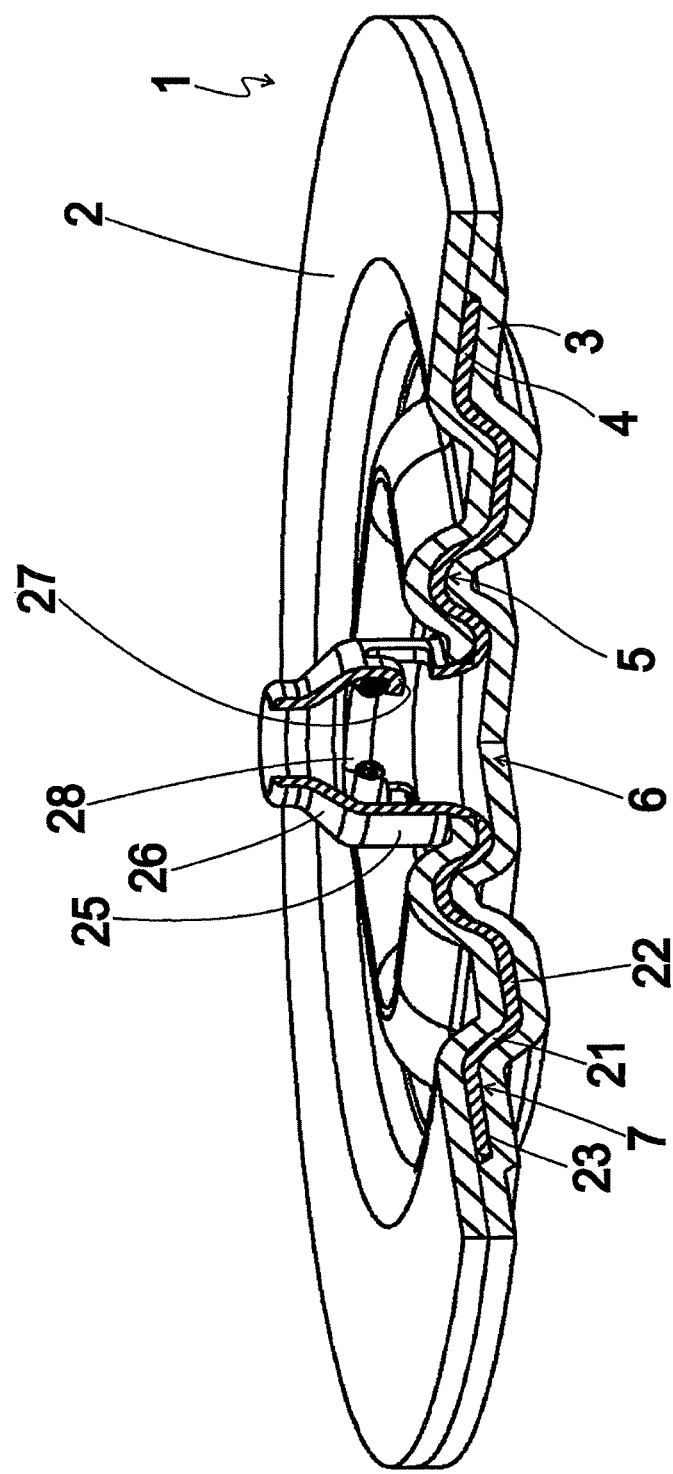
FIG. 16 shows in a perspective view a second modification of the second exemplary embodiment anchored in a laminate structure.

FIG. 16 shows, in a sectional perspective view corresponding to FIG. 1, a second modification of the second exemplary embodiment anchored in a laminate structure 1; in the second modification of the second exemplary embodiment and in the first modification of the second exemplary embodiment, as well as in the second exemplary embodiment itself, mutually corresponding elements are provided with the same reference numerals and are not explained in greater detail below. The second modification of the second exemplary embodiment according to FIG. 15 [sic; 16] is characterized in that the flared sleeve 25 has a tapered cross section in a head section 26 facing away from the inner section 6, and is formed with radially inwardly projecting retaining tongues 27 which secure a locking ring 28 situated between the retaining tongues 27 and the head section 26. In the second modification of the second exemplary embodiment according to FIG. 16, the locking ring 28 may be utilized for a locking connection with an adaptable add-on element, not illustrated in FIG. 16.

Figure 17:
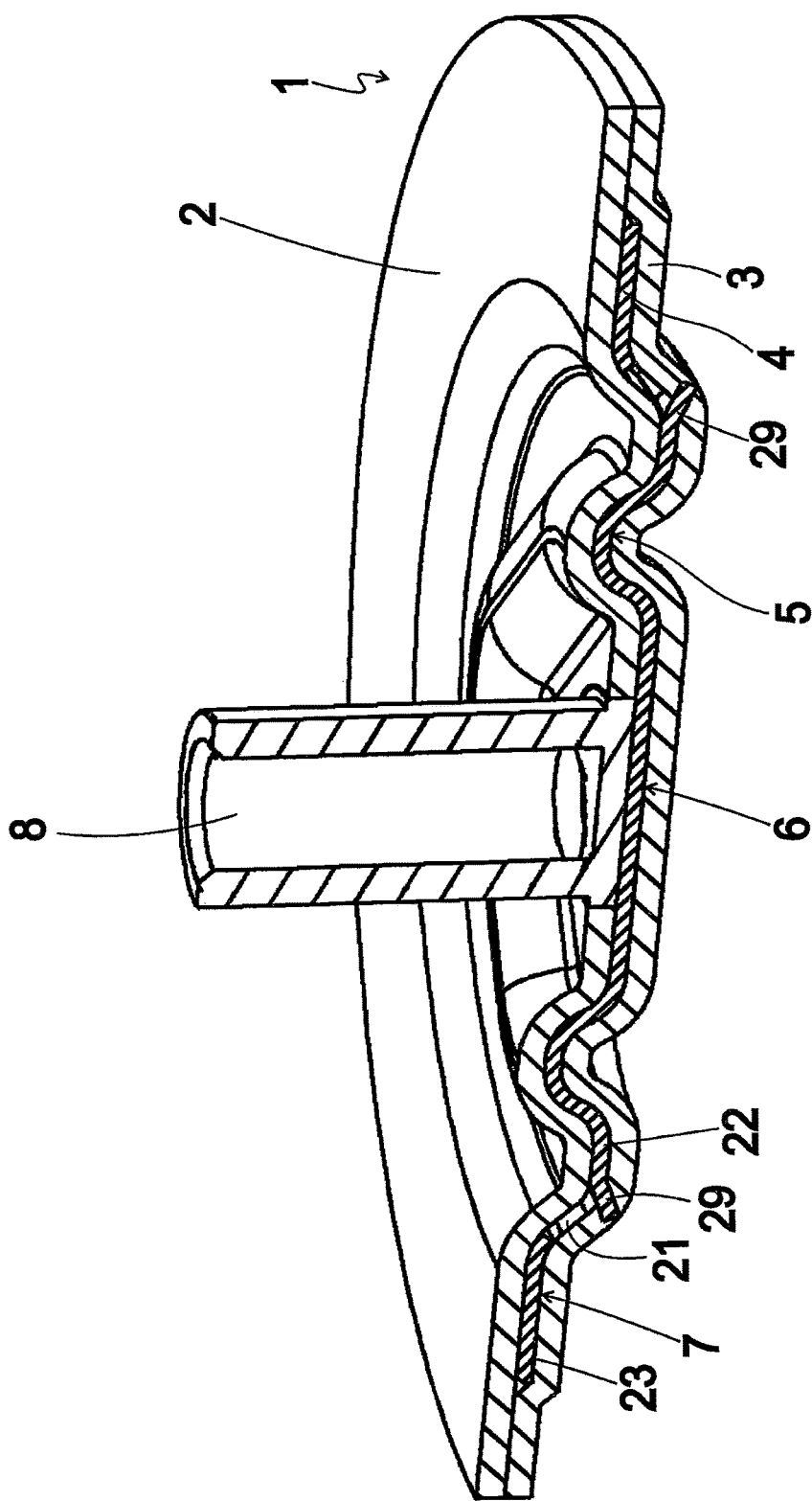
FIG. 17 shows in a sectional perspective view a first refinement of the second exemplary embodiment anchored in a laminate structure.

FIG. 17 shows, in a sectional perspective view corresponding to FIG. 1, a first refinement of the second exemplary embodiment anchored in a laminate structure 1; in the first refinement of the second exemplary embodiment and in the modifications of the second exemplary embodiment, as well as in the second exemplary embodiment itself, mutually corresponding elements are provided with the same reference numerals and are not explained in greater detail below. The first refinement of the second exemplary embodiment according to FIG. 17 has a number of radially outwardly extending flared tongues 29 which are formed on the radially outer side of the intermediate area 22, and which are flared at an angle out of the plane in which the inner section 6 and the intermediate area 22 are situated, opposite from the reinforcing bevel 21. This results in engagement with the second laminate cover layer 3 situated on this side of the base plate 4, with a corresponding permanent connection between the base plate 4 and the second laminate cover layer 3.

Figure 18:
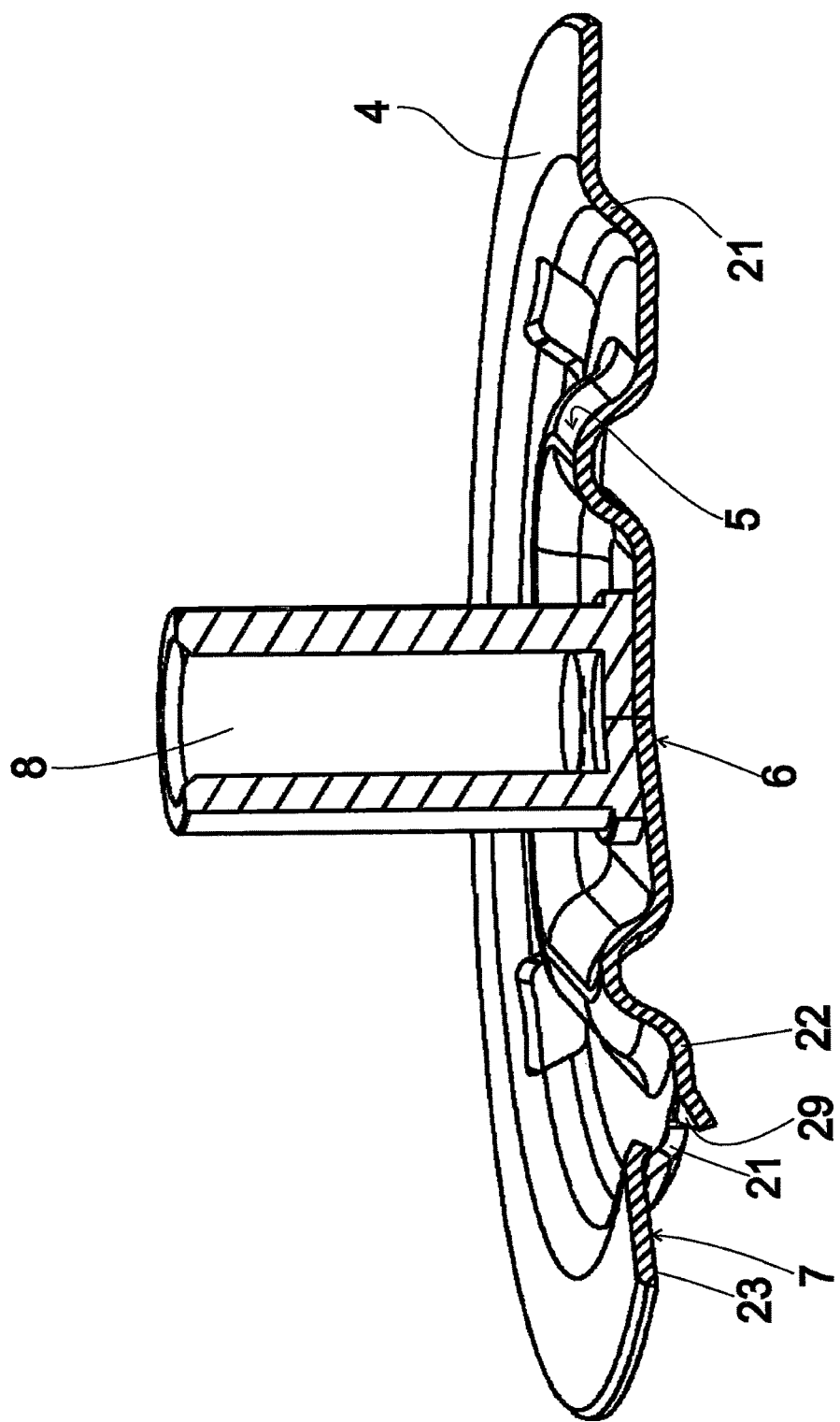
FIG. 18 shows in a sectional perspective view the exposed first refinement of the second exemplary embodiment according to FIG. 17.

FIG. 18 shows in a sectional perspective view the exposed first refinement of the second exemplary embodiment according to FIG. 17. It is apparent from the illustration according to FIG. 18 that the claw tongues 29 have pointed tips to ensure reliable engagement with the second laminate cover layer 3 illustrated in FIG. 17.

Figure 19:
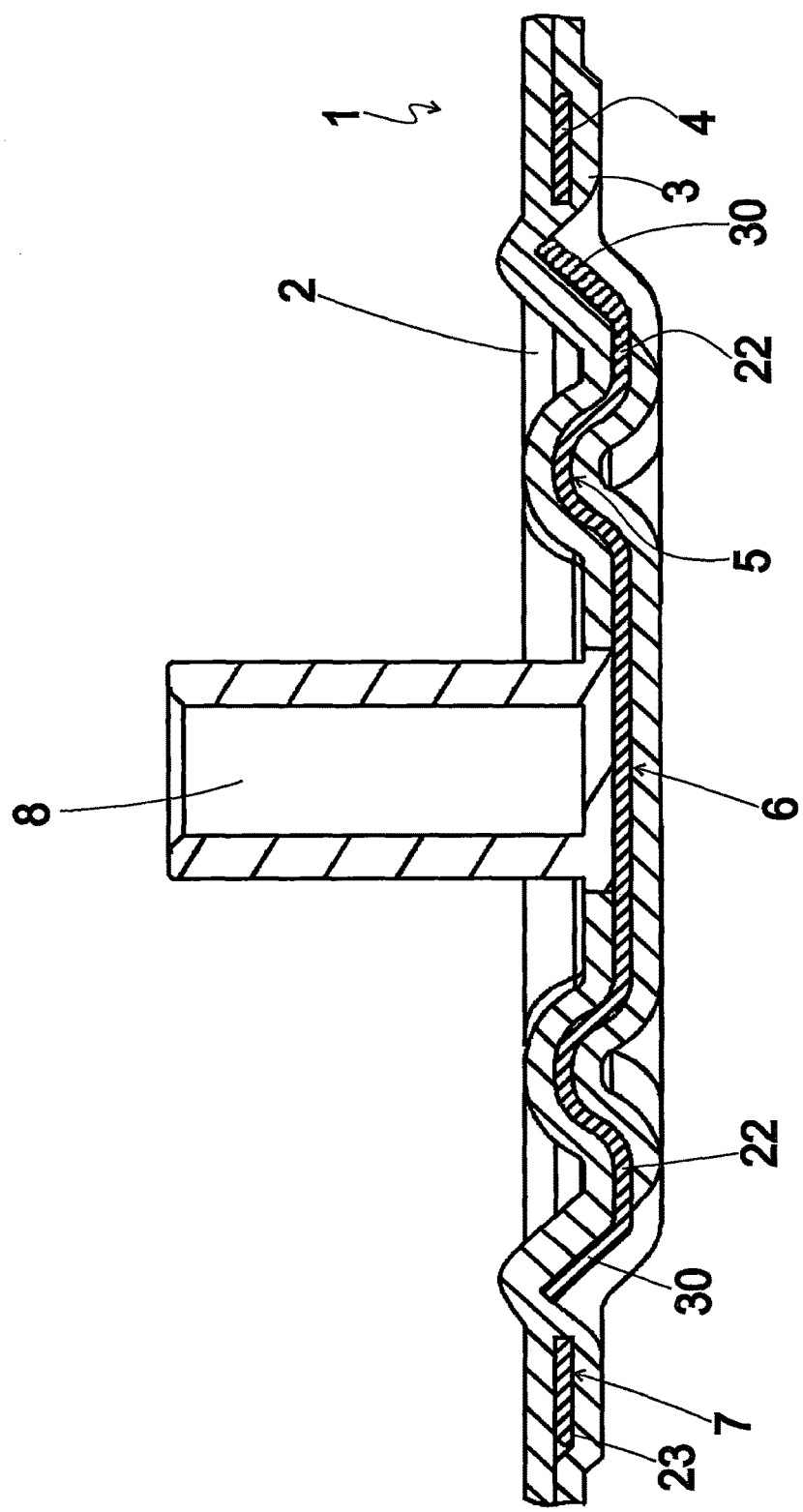
FIG. 19 shows in a sectional view a second refinement of the second exemplary embodiment anchored in a laminate structure.

FIG. 19 shows in a sectional side view a second refinement of the second exemplary embodiment anchored in a laminate structure 1; in the second refinement of the second exemplary embodiment and in the first refinement of the second exemplary embodiment, as well as in the second exemplary embodiment itself with associated modifications, mutually corresponding elements are provided with the same reference numerals and are not explained in greater detail below. The second refinement of the second exemplary embodiment according to FIG. 19 is characterized in that flared tongues 30 are formed in the reinforcing bevel 21, and with a pointed section protrude beyond the plane in which the edge area 23 of the outer section 7 and the vertex of the rib 5 are situated. This results in engagement with the first laminate cover layer 2 situated on the elevated area of the rib 5, with a correspondingly good connection with same.

Figure 20:
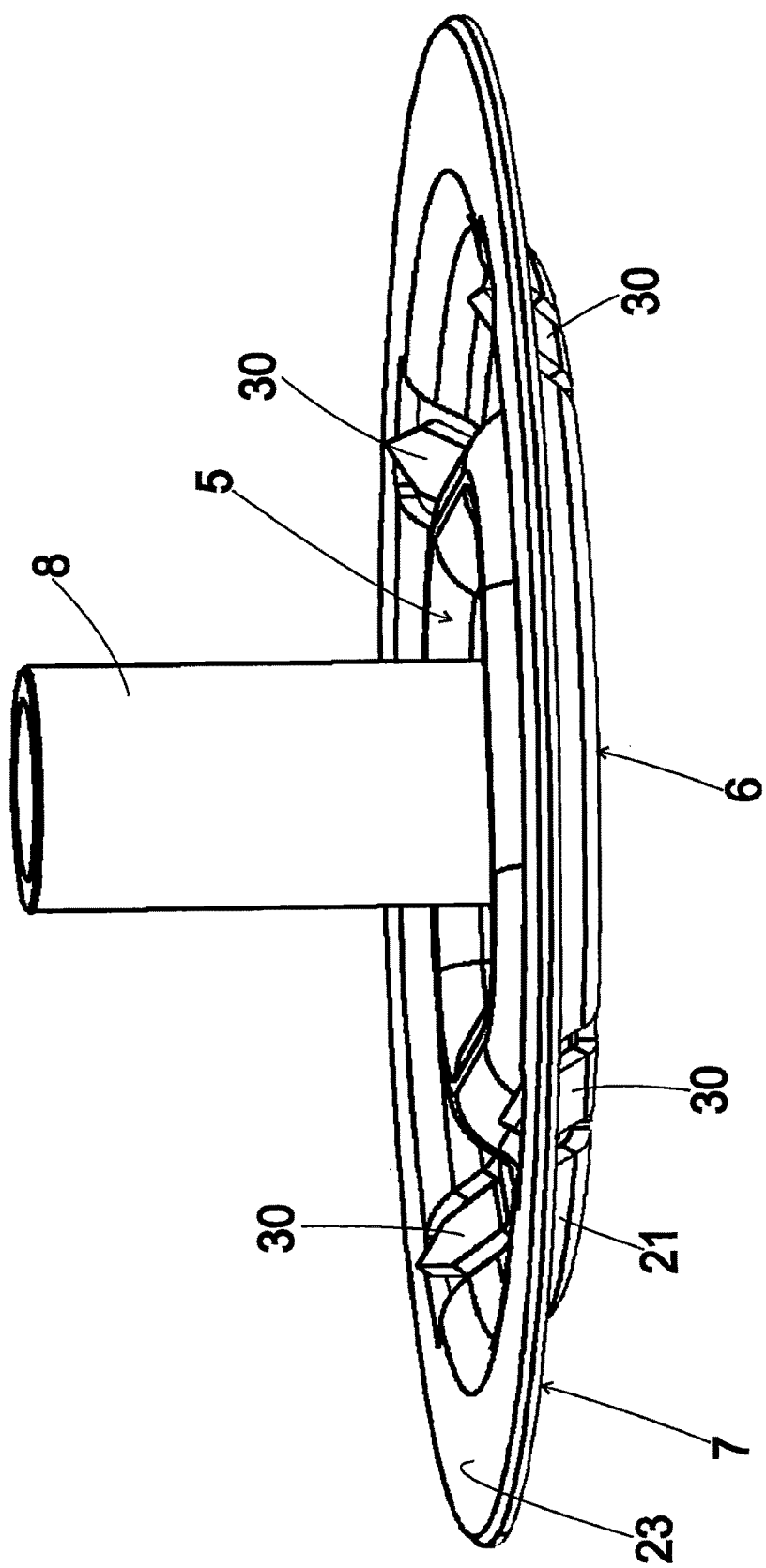
FIG. 20 shows in a perspective view the exposed second refinement of the second exemplary embodiment according to FIG. 19.

FIG. 20 shows in a perspective view the second refinement of the second exemplary embodiment according to FIG. 19, anchored in a laminate structure 1. It is apparent from the illustration according to FIG. 20 that the flared tongues 30 are situated in the radial direction in alignment with the corner areas of the rib 5 and the fastening bolt 8 in order to achieve a particularly reliable connection with the first laminate cover layer 2 in these axes.

Figure 21:
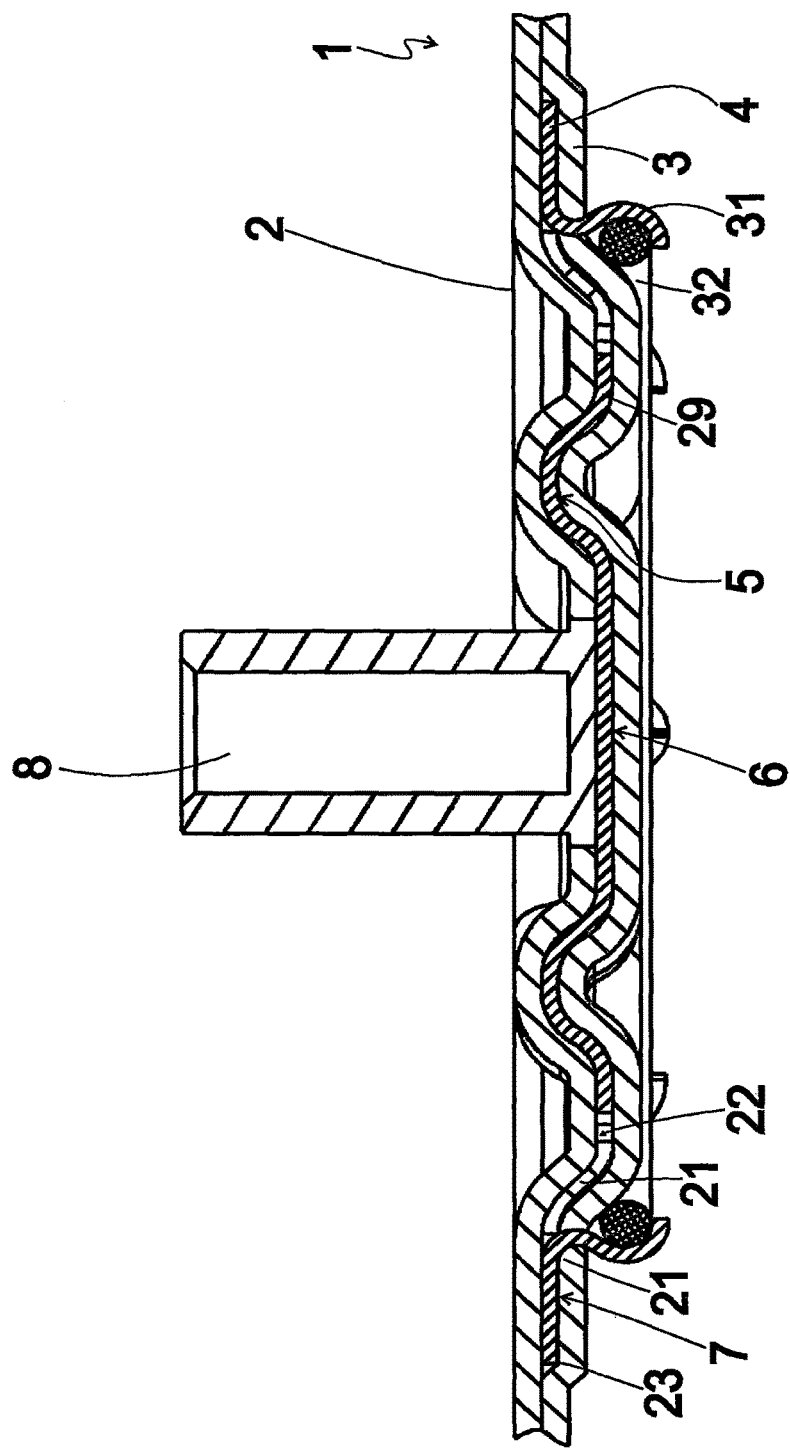
FIG. 21 shows in a sectional view a third refinement of the second exemplary embodiment anchored in a laminate structure.

FIG. 21 shows, in a side view corresponding to FIG. 19, a third refinement of the second exemplary embodiment anchored in a laminate structure 1; in the third refinement of the second exemplary embodiment and in the refinements of the second exemplary embodiment explained above and in the second exemplary embodiment itself with associated modifications, mutually corresponding elements are provided with the same reference numerals and are not explained in greater detail below. In the third refinement of the second exemplary embodiment, ring retaining tongues 31 are formed on the base plate 4 on the radially inner side of the edge area 23, and protrude at approximately right angles from the side facing away from the fastening bolt 8, and are curved radially inwardly in an open circular arc and retain a pressure ring 32. The second laminate cover layer 3, situated on the side of the base plate 4 facing away from the fastening bolt 8, may be pressed against the reinforcing bevel 21 by means of the pressure ring 32 with appropriate pretensioning of the ring retaining tongues 31.

Figure 22:
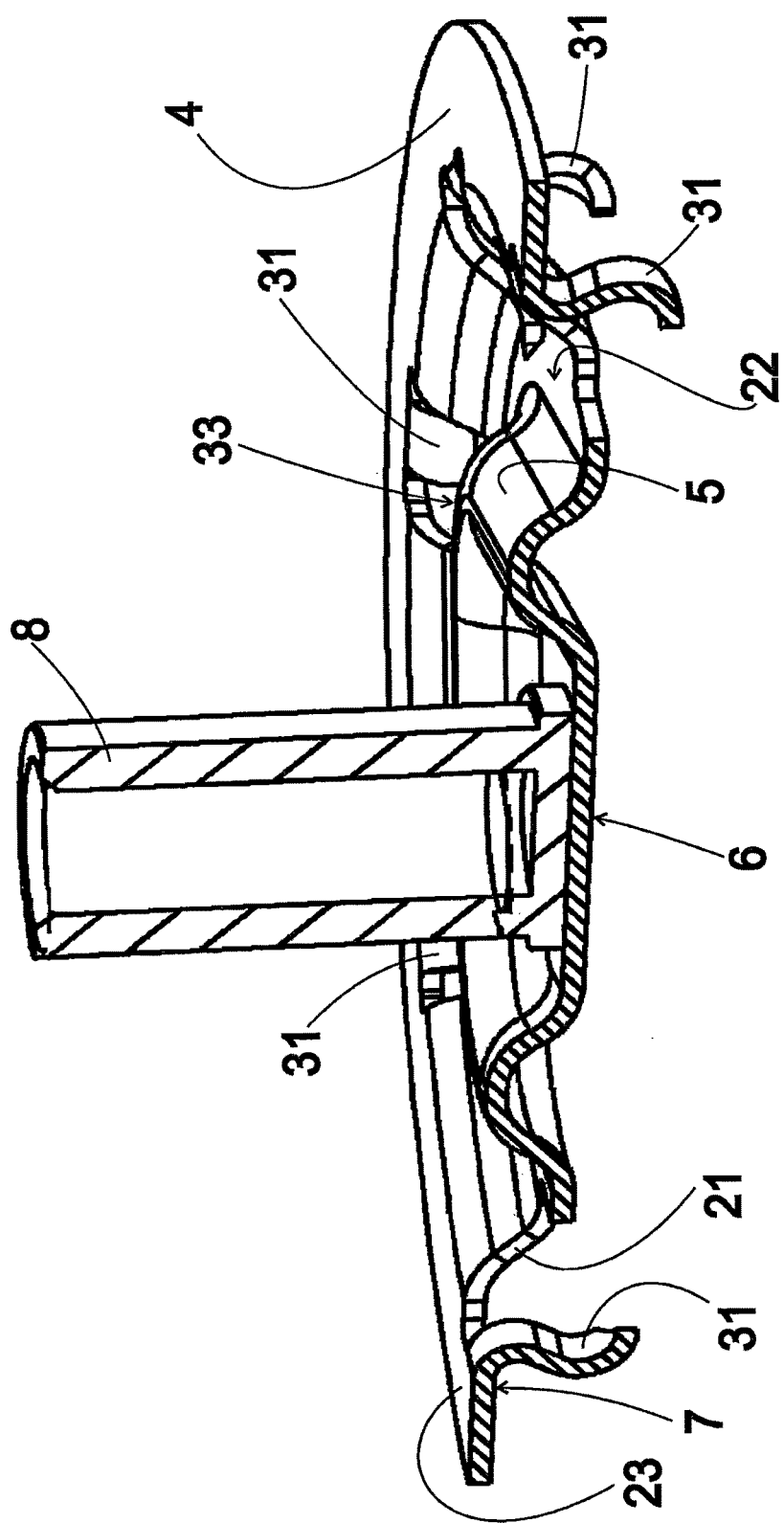
FIG. 22 shows in a perspective sectional view the exposed third refinement of the second exemplary embodiment according to FIG. 21.

FIG. 22 shows in a sectional perspective view the exposed third refinement of the second exemplary embodiment according to FIG. 21. It is apparent from 22 that the ring retaining tongues 31 are situated at regular intervals around the circumference, resting in retaining tongue recesses 33 formed in the reinforcing bevel 21.

Figure 23:
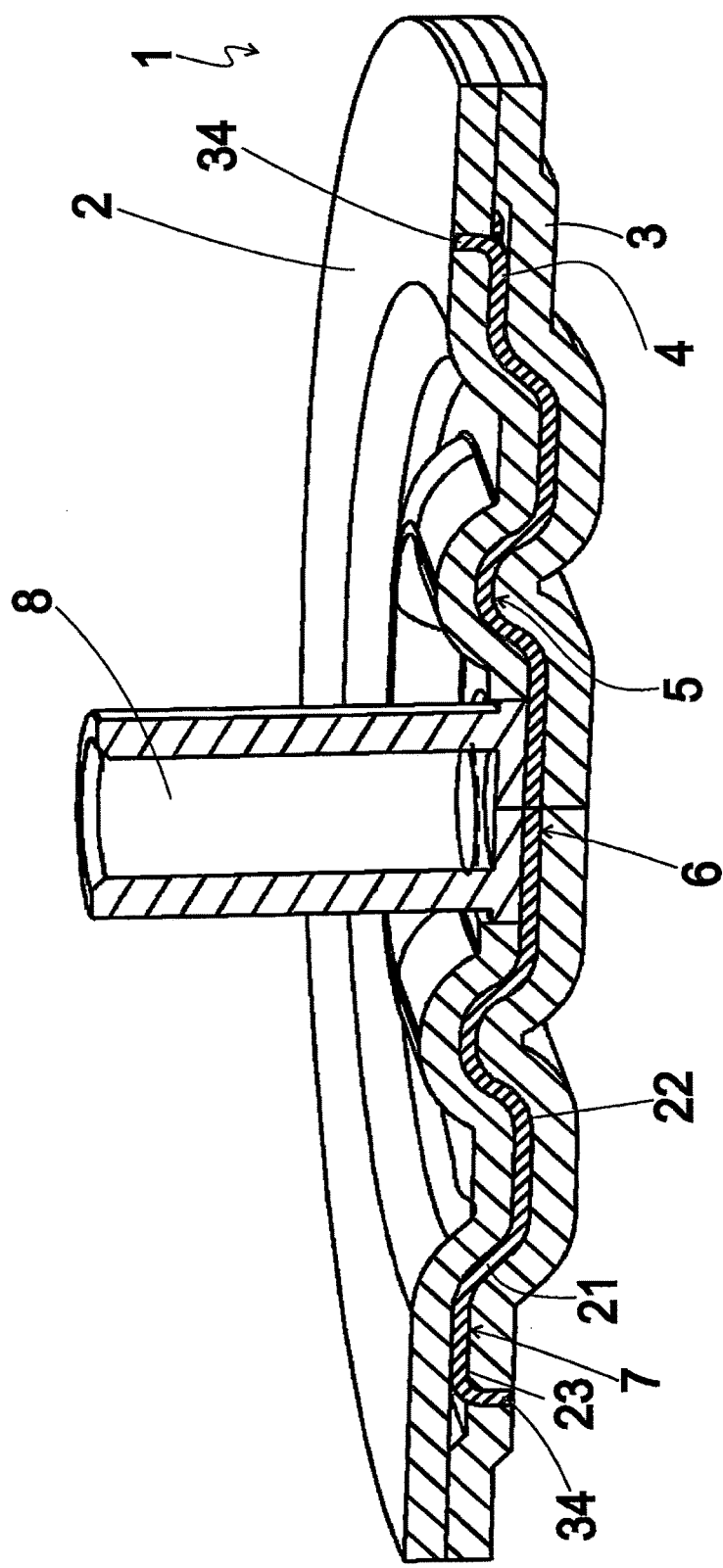
FIG. 23 shows in a sectional perspective view a fourth refinement of the second exemplary embodiment anchored in a laminate structure.

FIG. 23 shows in a sectional perspective view a fourth refinement of the second exemplary embodiment anchored in a laminate structure 1; in the fourth refinement of the second exemplary embodiment and the refinements of the second exemplary embodiment explained above and in the second exemplary embodiment itself with associated modifications, mutually corresponding elements are provided with the same reference numerals and are not explained in greater detail below. The fourth refinement of the second exemplary embodiment according to FIG. 23 is characterized in that a number of axial tongues 34 are formed on the radially outer side of the edge area 23, and extend at right angles on both sides away from the plane in which the edge area 23 and the vertex of the rib 5 are situated, and engage with the first laminate cover layer 2 and with the second laminate cover layer 3.

Figure 24:
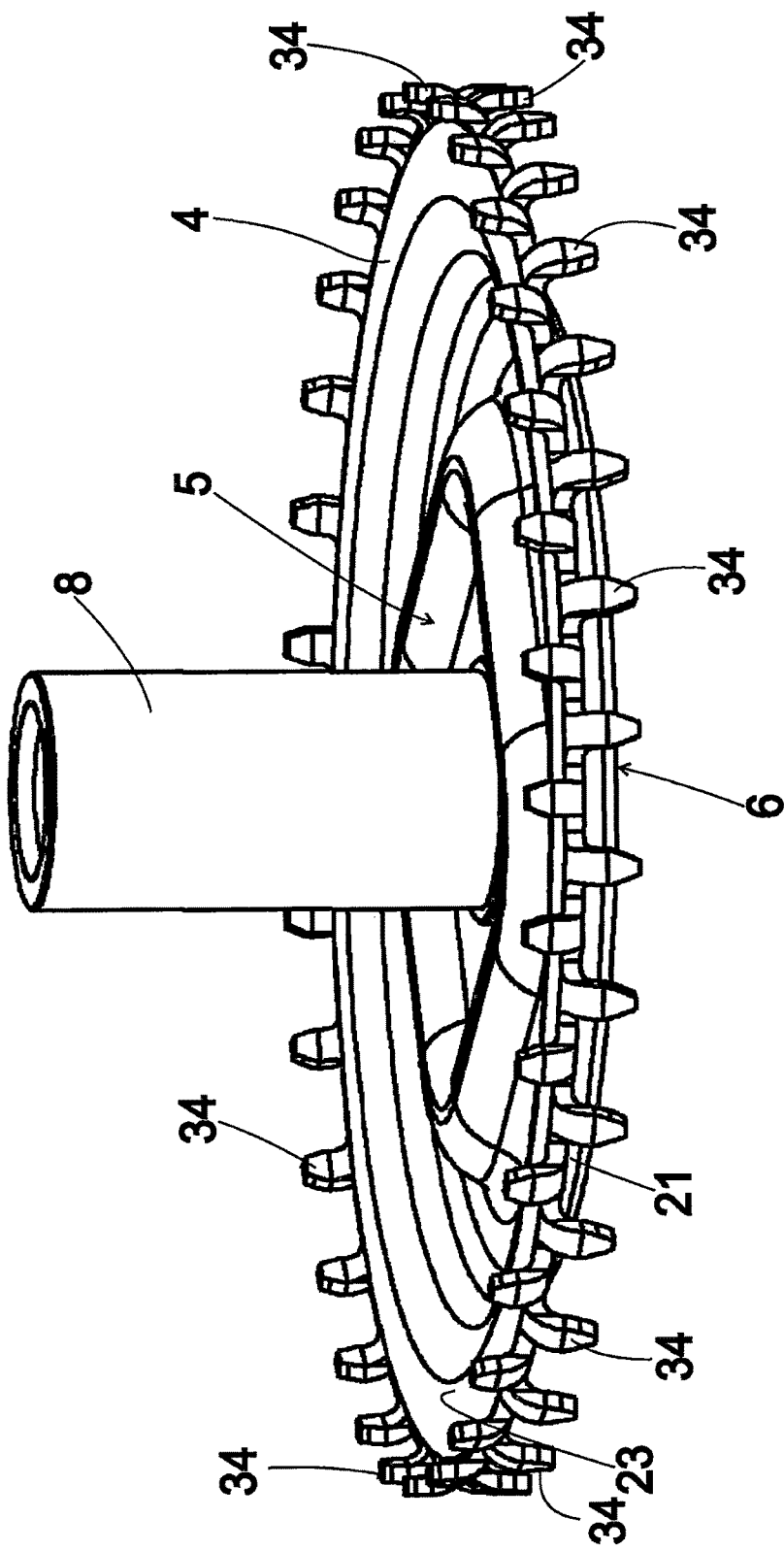
FIG. 24 shows in a perspective view the exposed fourth refinement of the second exemplary embodiment according to FIG. 23.

FIG. 24 shows in a perspective view the exposed fourth refinement of the second exemplary embodiment according to FIG. 23. It is clearly apparent from FIG. 24 that the axial tongues 34 protrude in alternation from both sides of the edge area 23 in the circumferential direction and are spaced comparatively close to one another, thus ensuring very good prefixing in still dry laminate cover layers 2, 3, and final anchoring of the base plate 4 in both laminate cover layers 2, 3 of the laminate structure 1.

Figure 25:
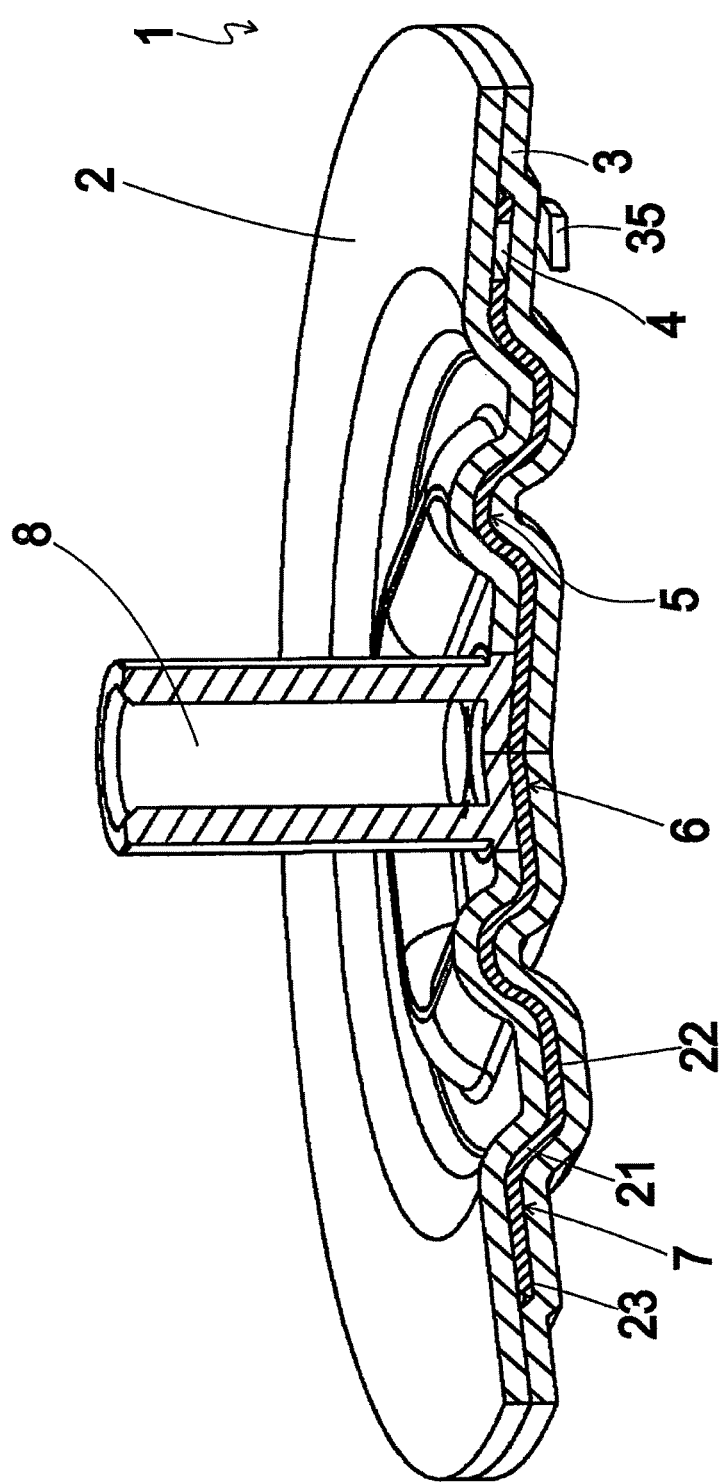
FIG. 25 shows in a sectional perspective view a fifth refinement of the second exemplary embodiment anchored in a laminate structure.

FIG. 25 shows in a sectional perspective view a fifth refinement of the second exemplary embodiment anchored in a laminate structure 1; in the fifth refinement of the second exemplary embodiment and in the refinements of the second exemplary embodiment explained above and in the second exemplary embodiment itself together with modifications, mutually corresponding elements are provided with the same reference numerals and are not explained in greater detail below. In the fifth refinement of the second exemplary embodiment according to FIG. 25, a number of rear engagement tongues 35 are present, which are connected to the edge area 23, and in the axial direction are situated on the side of the base plate facing away from the fastening bolt 8, at a distance from the edge area 23. The rear engagement tongues 35 thus engage behind the second laminate cover layer 3 situated on the side of the base plate 4 facing away from the fastening bolt 8, and secure the second laminate cover from detaching from the base plate 4.

Figure 26:
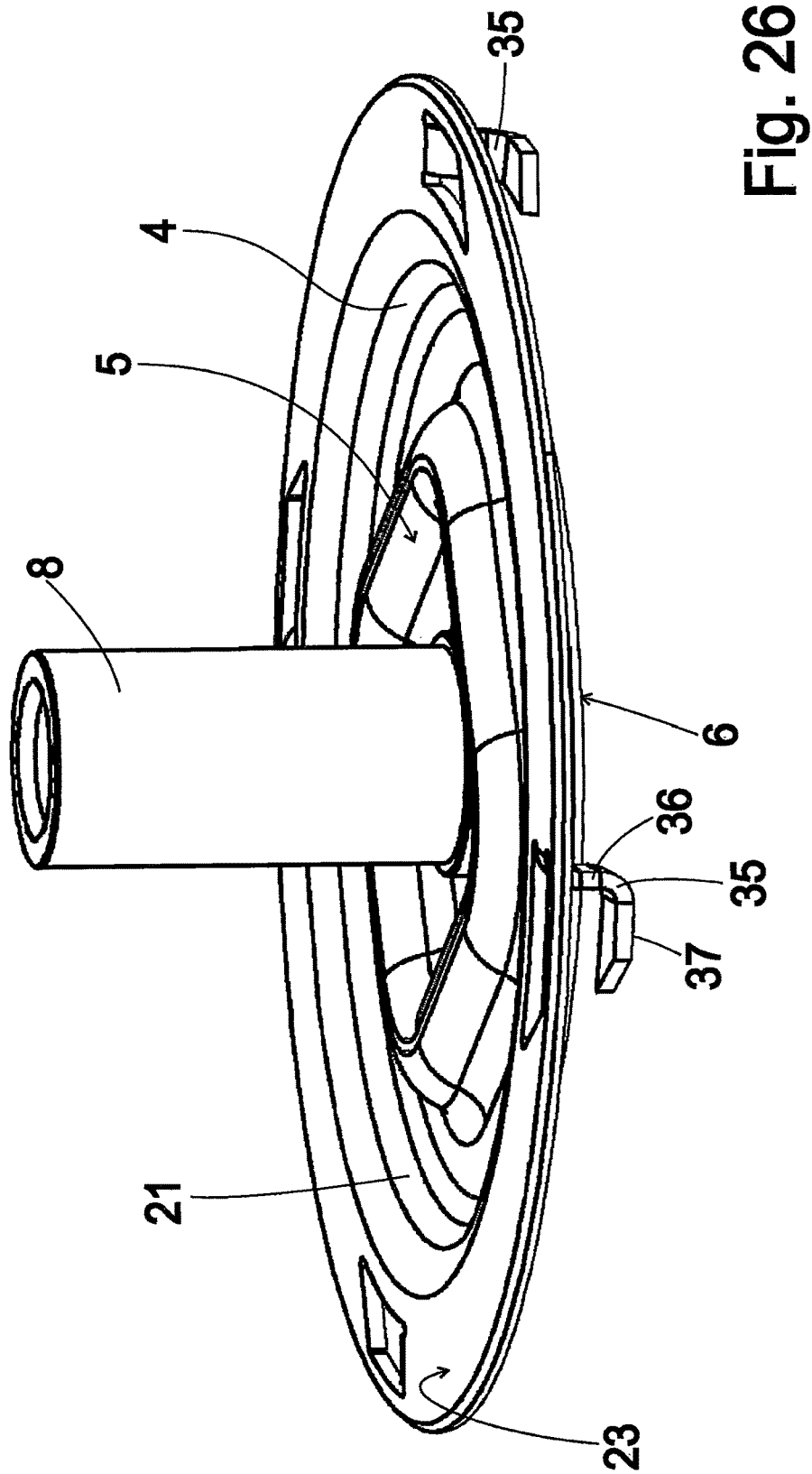
FIG. 26 shows in a perspective view the exposed fifth refinement of the second exemplary embodiment according to FIG. 25.

FIG. 26 shows in a perspective view the fifth refinement of the second exemplary embodiment according to FIG. 25. It is apparent from the illustration according to FIG. 26 that the rear engagement tongues 35 extend circumferentially in the same direction, and have a pointed end section 37 which is connected to a flared section 36, the end sections 37 being oriented circumferentially in the same direction.

For assembly, the device according to the invention according to FIG. 26 is placed on a laminate layer 3 and rotated with light pressure. In the process, the end section 37 works into the laminate layer 3 (for woven fabrics, between the warp/weft, or for cross plies, between the at least two differently oriented layers), forming an undercut between the edge area 23 and the laminate layer 3. This allows stable prefixing of the device according to the invention on the laminate layer 3.

Figure 27:
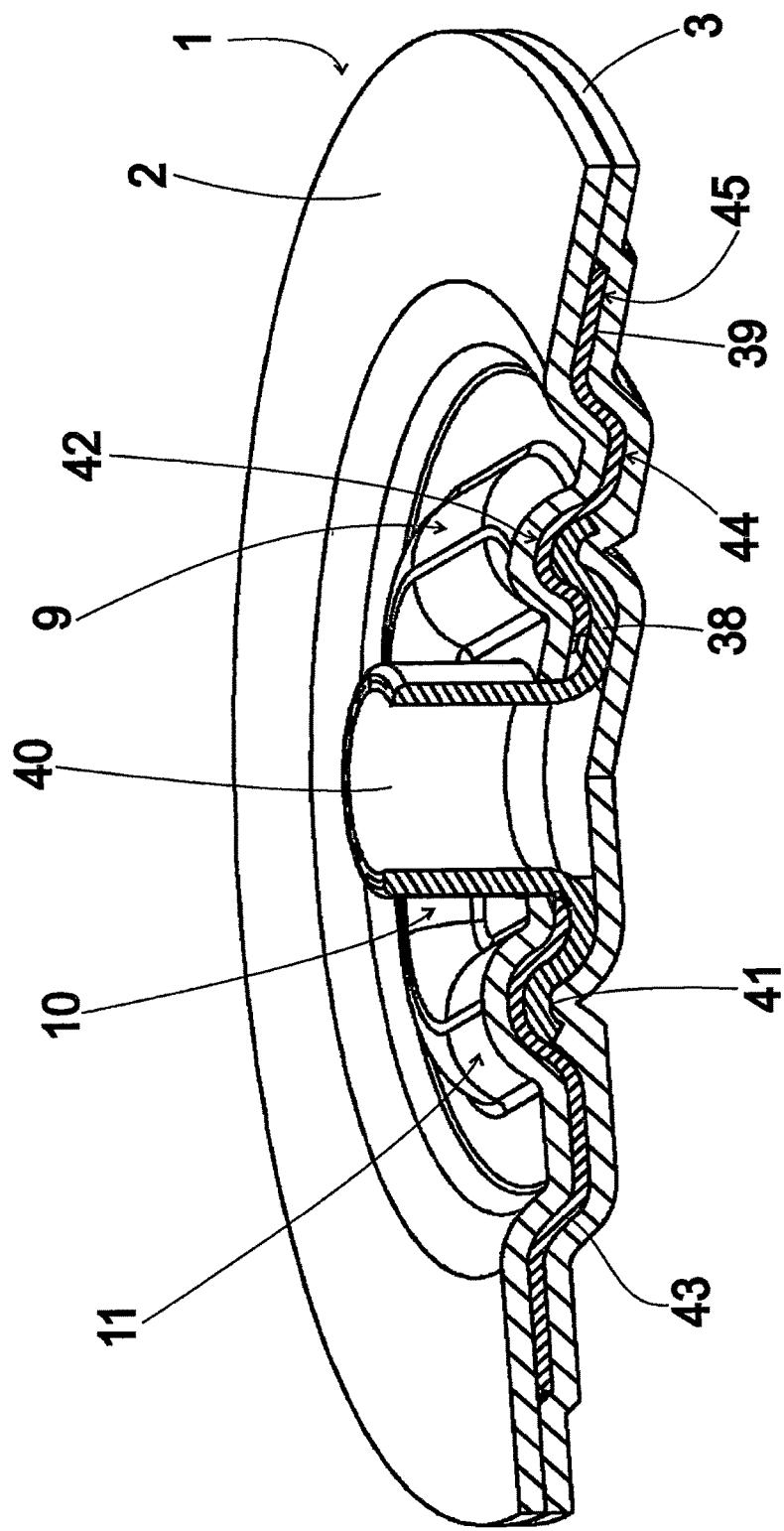
FIG. 27 shows in a sectional perspective view a third exemplary embodiment of a device according to the invention anchored in a laminate structure.

FIG. 27 shows in a perspective sectional view a third exemplary embodiment of a device according to the invention anchored in a laminate structure 1; in the third exemplary embodiment and the exemplary embodiments with refinements and modifications explained above, mutually corresponding elements are provided with the same reference numerals and are not explained in greater detail below. In the third exemplary embodiment according to FIG. 27, the carrier assembly has a two-part design with an inner plate 38 and an outer plate 39, which are placed one on top of the other with an overlap in sections. The material thickness of the inner plate 38 is greater than the material thickness of the outer plate 39. A centrally situated flared sleeve 40 is formed on the inner plate 38, corresponding to the first modification of the second exemplary embodiment according to FIG. 15. The flared sleeve 40 is surrounded at a radial distance by an outer rib 41 of a rib structure. The outer plate 39 radially inwardly adjoins the flared sleeve 40, and on the radially inner side is formed with an inner rib 42 of the rib structure, which conforms to the shape of the outer rib 41 of the inner plate 38, so that when the outer plate 39 is placed on the side of the inner plate 38 facing the flared sleeve 40, the inner rib 42 of the outer plate 39 comes to rest on the outer rib 41 of the inner plate 38 with a positive fit.

The outer plate 39, corresponding to the second exemplary embodiment according to FIG. 12, has a reinforcing bevel 43 which is situated on the radially outer side of the inner rib 42, and which separates an intermediate area 44, adjoining the inner rib 42 on the radially inner side, from an edge area 45 situated on the radially outer side of the reinforcing bevel 43; also in the third exemplary embodiment according to FIG. 27, the intermediate area 44 and the edge area 45 are situated in different planes in the axial direction.

Figure 28:
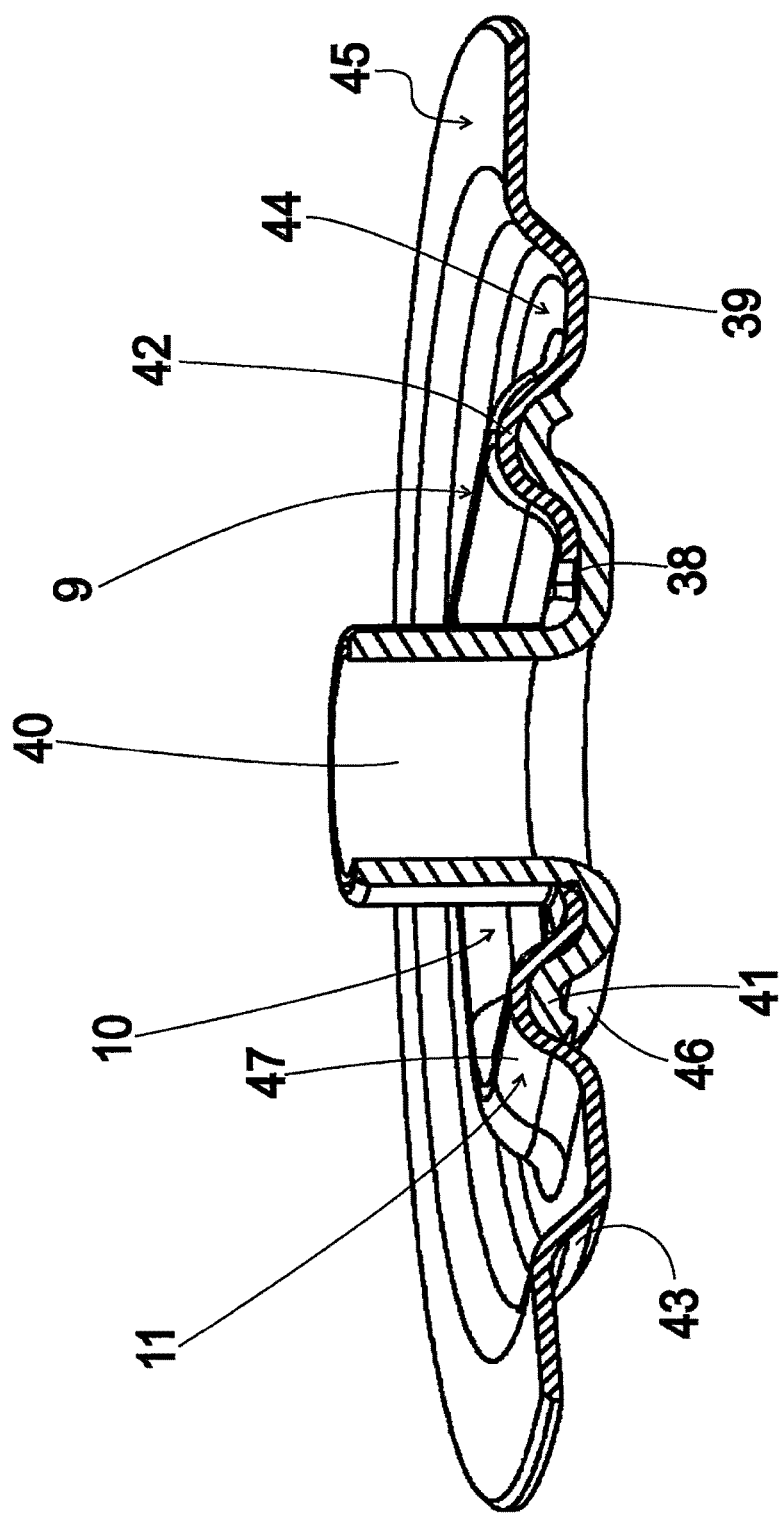
FIG. 28 shows in a sectional perspective view the exposed third exemplary embodiment.

FIG. 28 shows in a sectional perspective view the exposed third exemplary embodiment according to FIG. 27. It is apparent from FIG. 28 that, corresponding to the first exemplary embodiment according to FIG. 1 and the second exemplary embodiment according to FIG. 14, the outer rib 41 of the inner plate 38 as well as the inner rib 42 of the outer plate 39 have a number of straight rib sections 46, 47 which have essentially the same length and are oriented in pairs at right angles to one another.

Figure 29:
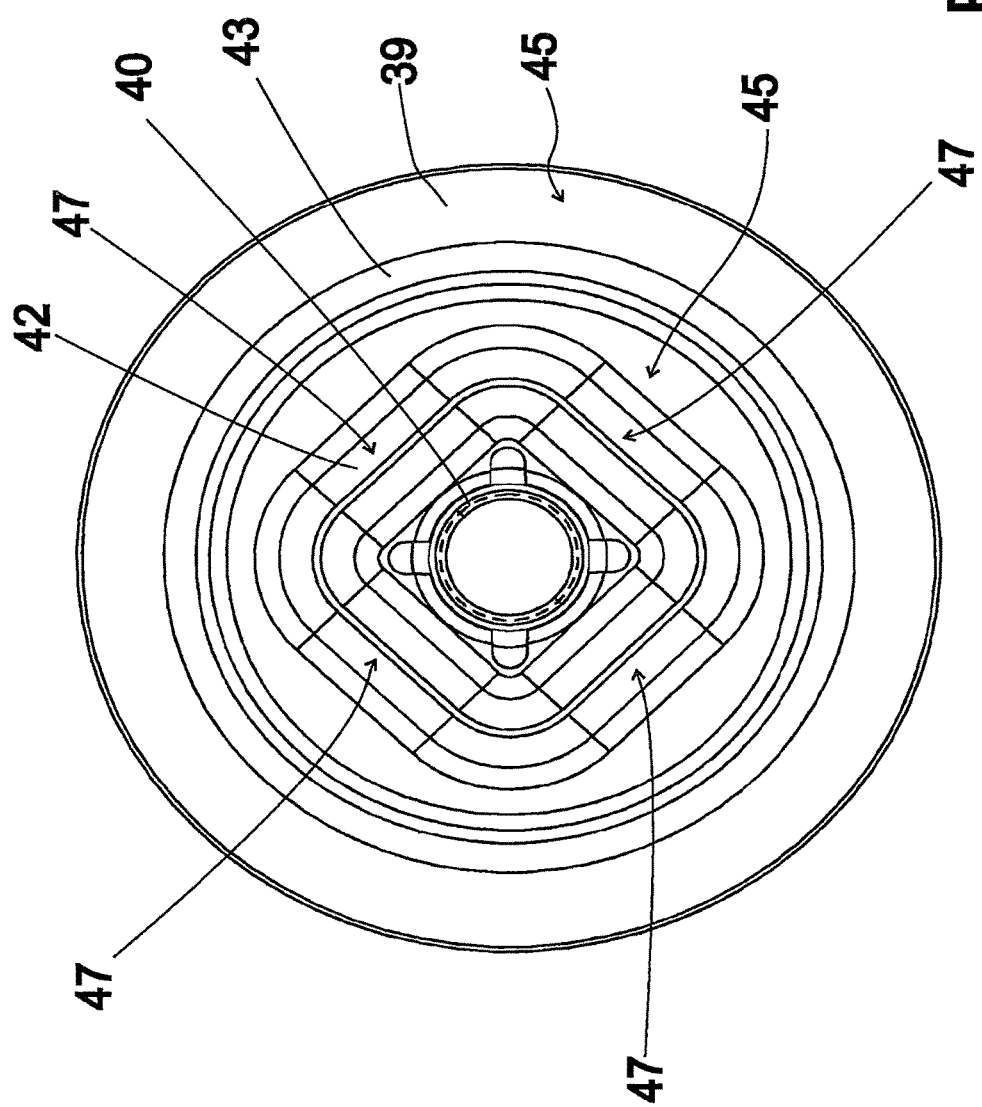
FIG. 29 shows in a top view the exposed third exemplary embodiment.

FIG. 29 shows in an exposed top view the third exemplary embodiment according to FIG. 27. It is apparent from the illustration according to FIG. 29 that in the third exemplary embodiment according to FIG. 27, the outer plate 39 has a circular design, and the outer plate 39 completely covers the inner plate 38 from the side on which the flared sleeve 40 is situated. The originally loose combination of the inner plate 38 and the outer plate 39 becomes tight in the axial direction upon anchoring in the laminate structure 1.

The inner plate 38 and the outer plate 39 have already been prefixed during assembly by means of the so-called spring nut principle. The features of the spring nut principle are implemented in the outer plate 39 by the rib sections 46, 47 and by the upwardly arched rib structure 9. This prefixing is sufficient for introducing the inner plate 38 and the outer plate 39, also without shifting in dry fabric layers which subsequently form the laminate structure 1. The final fixing takes place after the resin with which the fabric layers have been impregnated has cured.

Figure 30:
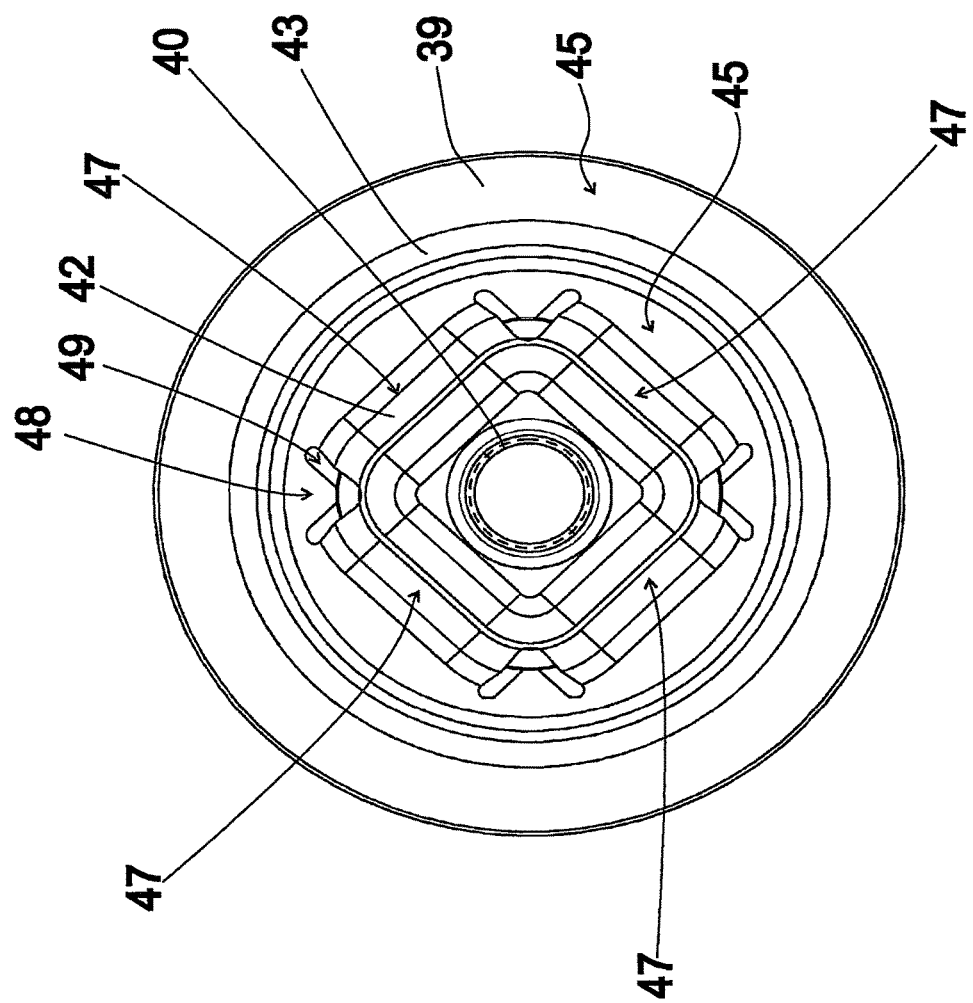
FIG. 30 shows in a top view an exposed first refinement of the third exemplary embodiment.

FIG. 30 shows in a top view an exposed first refinement of the third exemplary embodiment; in the first refinement of the third exemplary embodiment and in the third exemplary embodiment itself, mutually corresponding elements are provided with the same reference numerals and are not explained in greater detail below. In the corner areas of the rib sections 47 of the inner rib 42 of the outer plate 39, the first refinement of the third exemplary embodiment according to FIG. 30 in each case has a securing tongue 48 as a connecting structure, which is situated in a securing tongue recess 49 formed in the inner rib 41 and protrudes radially inwardly. The securing tongues 48 are situated in the plane of the intermediate area 44 of the outer plate 39, and engage behind the radially outer edge of the outer rib 41 of the inner plate 38.

Figure 31:
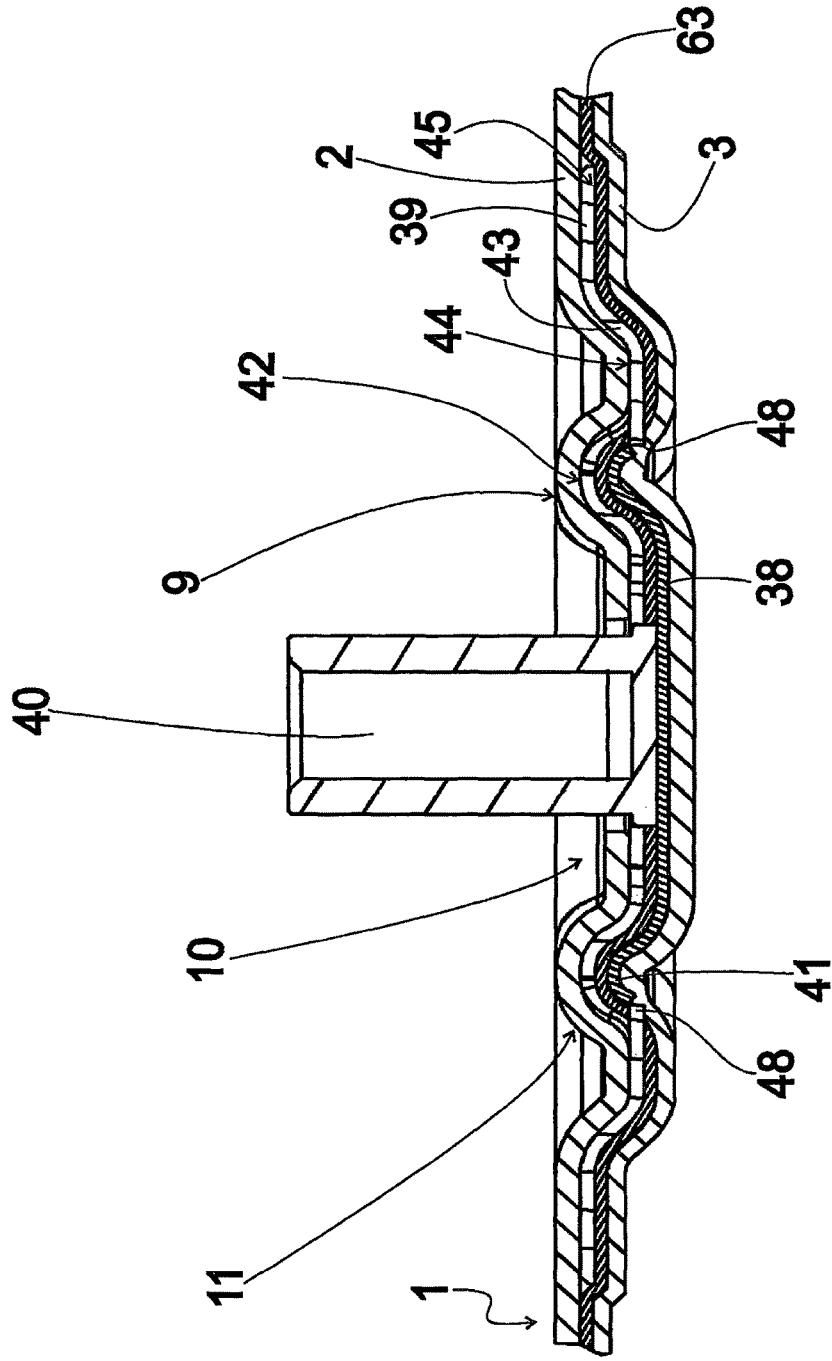
FIG. 31 shows in a sectional side view the first refinement of the third exemplary embodiment according to FIG. 30, anchored in a laminate structure.

FIG. 31 shows in a sectional side view the first refinement of the third exemplary embodiment according to FIG. 30, anchored in a laminate structure 1 which now also has a laminate intermediate layer 63. The laminate intermediate layer 63 is situated between the inner plate 38 and the outer plate 39, and is connected to the laminate cover layers 2, 3 on the radially outer side of the outer plate 39. In the dry state, the laminate intermediate layer 63 is used to facilitate handling during formation of the laminate structure 1, and provides improved strength in the edge area of the inner plate 38 and in the connection of the inner plate 38 to the laminate cover layer 3 facing away from the fastening element 40. It is also apparent from FIG. 31 that the securing tongues 48 engage behind the outer edge of the outer rib 41 of the inner plate 38 with approximately one-half the material thickness of the inner plate 38, so that the inner plate 38 and the outer plate 39 may also be joined outside the laminate structure 1 by pressing the inner plate 38 onto the outer plate 39 until the securing tongues 48 engage from behind. This results in simple handling of two-part devices according to the invention during the anchoring in the laminate structure 1.

Figure 32:
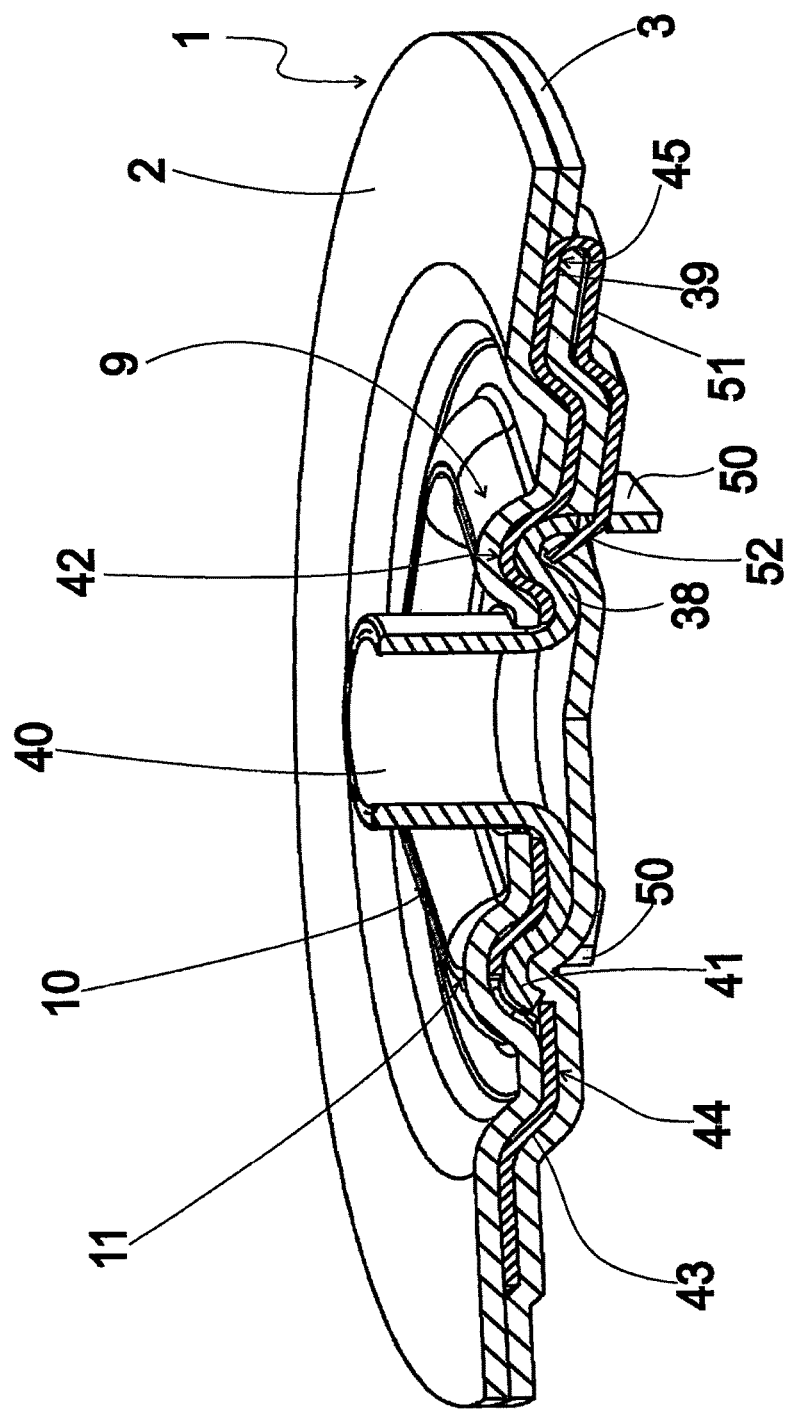
FIG. 32 shows in a sectional perspective view a second refinement of the third exemplary embodiment according to FIG. 27, anchored in a laminate structure.

FIG. 32 shows in a sectional perspective view a second refinement of the third exemplary embodiment anchored in a laminate structure 1; in the second refinement of the third exemplary embodiment and in the first refinement of the third exemplary embodiment, as well as in the third exemplary embodiment itself, mutually corresponding elements are provided with the same reference numerals and are not explained in greater detail below. The second refinement of the third exemplary embodiment according to FIG. 32 has receiving webs 50 of a connecting structure which are formed on the radially outer side of the inner plate 38, and which extend away from the outer rib 41 on the side of the inner plate 38 facing away from the flared sleeve 40. Receiving tongues 51 of the connecting structure are formed on the outer plate 39, which are connected to the edge area 45 on the radially outer side and follow the contour of the edge area 45, the reinforcing bevel 43, and the intermediate area 44 at a distance therefrom, extend radially inwardly in the direction of the receiving webs 50, and engage with the receiving webs 50. End sections 52, angled in the direction of the inner rib 42, are formed on the receiving tongues 51, and also protrude radially inwardly beyond the receiving webs 50.

It is apparent from the illustration according to FIG. 32 that the receiving tongues 51 engage behind the second laminate cover layer 3 situated on the side of the outer plate 39 facing away from the flared sleeve 40, and the end sections 42 engage with the second laminate cover layer 3. This ensures reliable anchoring in the laminate structure 1.

Figure 33:
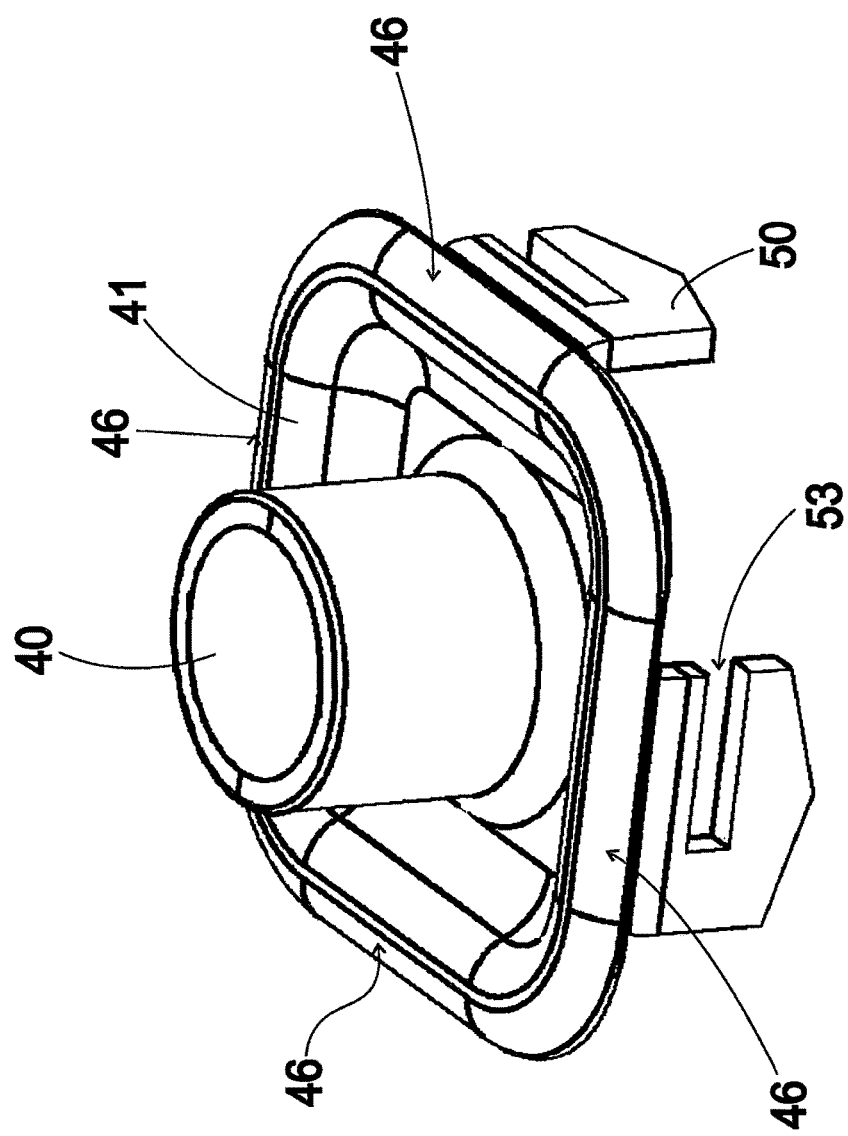
FIG. 33 shows in a perspective view an inner plate of the second modification of the third exemplary embodiment according to FIG. 32.

FIG. 33 shows in a perspective view the inner plate 38 in the second refinement of the third exemplary embodiment according to FIG. 32. It is apparent from the illustration according to FIG. 33 that the receiving webs 50 at their free ends have a tapered arrowhead design, are centrally molded onto the rib sections 46 of the inner plate 38 between the corner areas, and each have a slot-like receiving recess 53 for a respective receiving tongue 51. The receiving recesses 53 extend in parallel to the outer rib 41 and are open on the same respective side in the circumferential direction, so that the receiving tongues 51 are introducible into the receiving recesses 53 due to deflection which is forced by sliding over the receiving webs 50, and subsequent snapping in.

Figure 34:
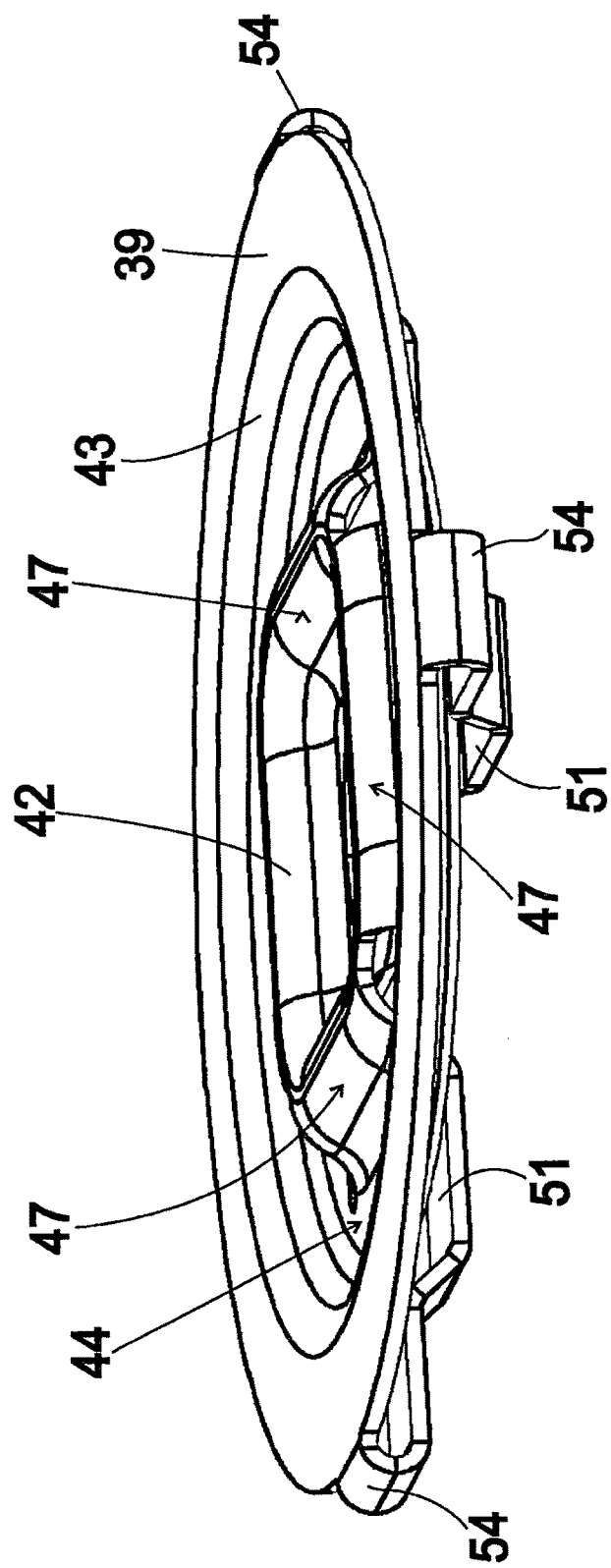
FIG. 34 shows in a perspective view an outer plate of the second modification of the third exemplary embodiment according to FIG. 32.

FIG. 34 shows in a perspective view the outer plate 39 in the second refinement of the third exemplary embodiment according to FIG. 32. It is apparent from the illustration according to FIG. 34 that the receiving tongues 51 are each connected to the edge area 45 via a connecting section 54, and in the relaxed configuration are situated at a distance from and parallel to the contour of the outer plate 39 in the radial direction.

Figure 35:
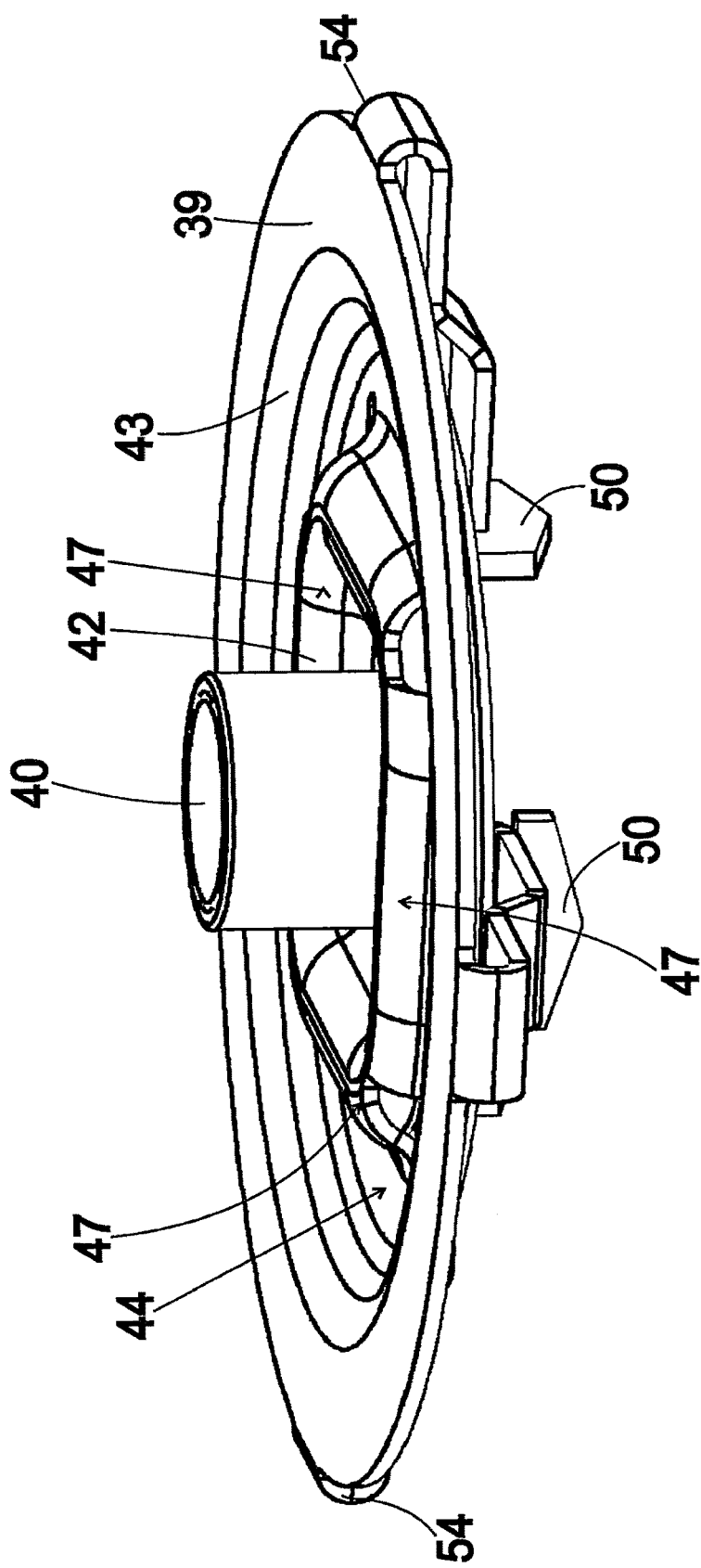
FIG. 35 shows in a perspective view the exposed second modification of the third exemplary embodiment according to FIG. 32, with the inner plate and the outer plate in an assembled arrangement.

FIG. 35 shows in a perspective view the exposed second refinement of the third exemplary embodiment according to FIG. 32. It is apparent from the illustration according to FIG. 35 that in the assembled arrangement of the inner plate 38 and the outer plate 39, the receiving tongues 51 are situated in the receiving recesses 53 without play in the axial direction, and lie flush against the end wall of the receiving recess 53 in question. As a result, the inner plate 38 is very stable, but optionally is also detachably connected to the outer plate 39.

Figure 36:
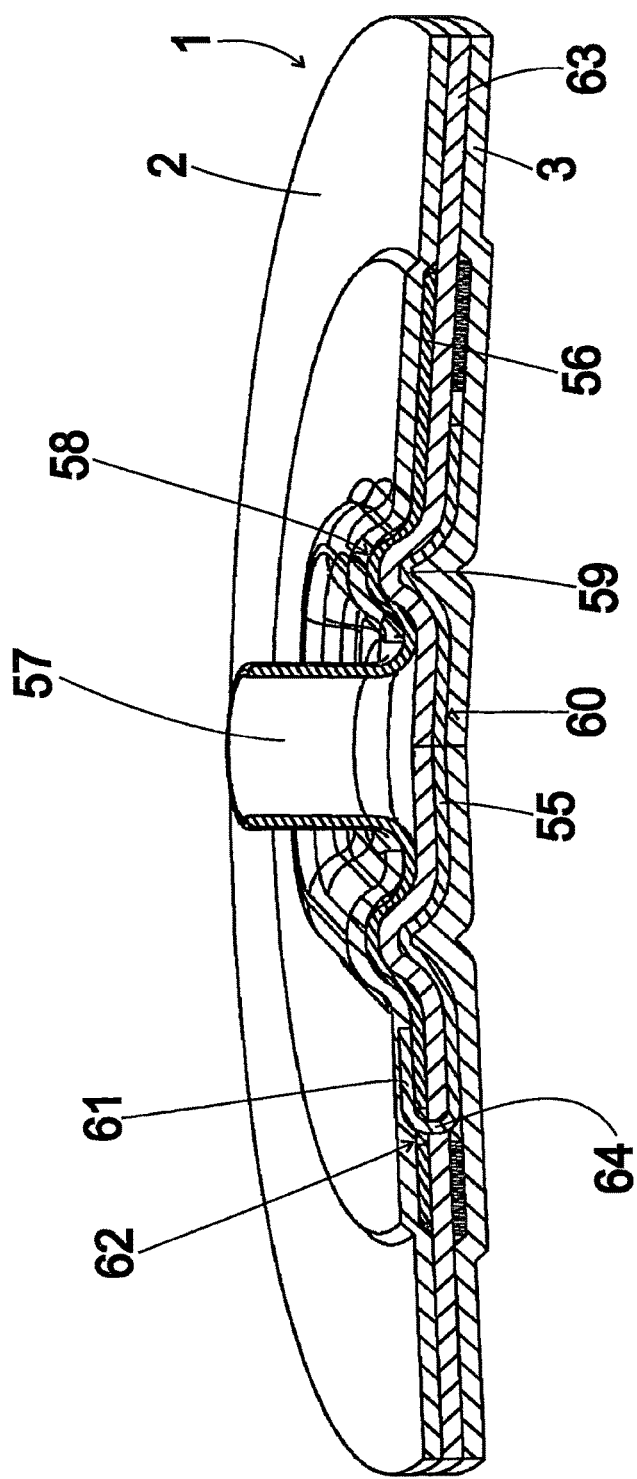
FIG. 36 shows in a sectional perspective view a fourth exemplary embodiment of a device according to the invention anchored in a laminate structure.

FIG. 36 shows in a sectional perspective view a fourth exemplary embodiment of a device according to the invention anchored in a laminate structure 1; in the fourth exemplary embodiment and in the refinements explained above of the exemplary embodiments explained above and in these exemplary embodiments themselves with modifications, mutually corresponding elements are provided with the same reference numerals and are not explained in greater detail below. The fourth exemplary embodiment according to FIG. 36, corresponding to the third exemplary embodiment, likewise has a two-part carrier assembly with an inner plate 55 and an outer plate 56 which protrudes radially outwardly beyond the inner plate 55, and which in the present case, however, have the same material thickness. In the fourth exemplary embodiment according to FIG. 36, the fastening element is formed on the outer plate 56 in the shape of a flared sleeve 57. At a radial distance from the flared sleeve 57, the outer plate 56 is formed with an inner rib 58, which is elevated in the same direction as the flared sleeve 57 with respect to the other areas of the outer plate 56. The outer plate 56 has a planar design on the radially outer side of the inner rib 58.

The inner plate 55 is formed with an outer rib 59, which is situated on the outer side of a planar center area 60 of the inner plate 55, and which is designed in such a way that it follows the outer contour of the inner rib 58 of the outer plate 56. On the radially outer side of the outer rib 57, the inner plate 55 is formed with a number of turned-up tongues 61 of a connecting structure, which in the arrangement according to FIG. 36 pass through push-through recesses 62 of the connecting structure formed in the outer plate 56 on the radially outer side of the inner rib 58, and which are situated radially inwardly facing the inner rib 58, resting on the side of the outer plate 56 facing away from the inner plate 55. In the arrangement according to FIG. 36, a laminate intermediate layer 63 of the laminate structure 1 is inserted between the first laminate cover layer 2 and the second laminate cover layer 3, and is situated between the inner plate 55 and the outer plate 56, and is penetrated by the turned-up tongues 61 at a connecting section 64.

Figure 37:
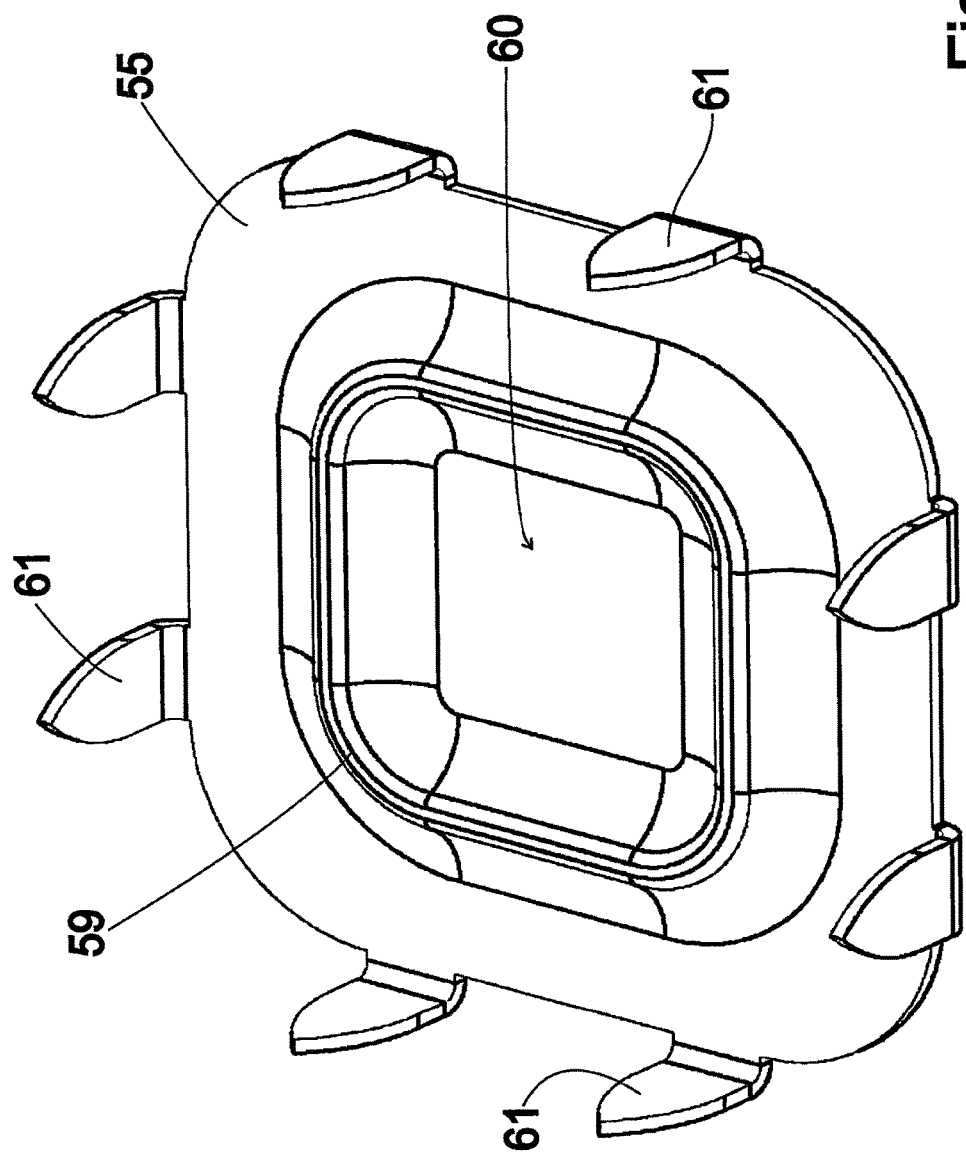
FIG. 37 shows in a perspective view an inner plate of the fourth exemplary embodiment according to FIG. 36.

FIG. 37 shows in a perspective view the inner plate 55 of the fourth exemplary embodiment according to FIG. 36. It is apparent from the illustration according to FIG. 37 that the turned-up tongues 61 are situated at uniform intervals along the outer edge of the inner plate 55, and are formed with tapering end sections having pointed tips. A laminate intermediate layer 63 may be perforated very easily in this way.

FIG. 38 shows in a perspective view the outer plate 56 of the fourth exemplary embodiment according to FIG. 36. It is apparent from the illustration according to FIG. 38 that the outer plate 56 has a number of push-through recesses 62 which correspond to the number of turned-up tongues 61 of the inner plate 55, and which are situated between the inner rib 58 and the outer edge of the outer plate 56, and positioned and dimensioned for play-free or essentially play-free accommodation of the turned-up tongues 61.

The fourth exemplary embodiment, explained with reference to FIG. 36 to FIG. 38, is characterized in that the combination of the inner plate 55 and the outer plate 56 is prefixable on a laminate intermediate layer 63 before the laminate structure 1 together with the laminate cover layers 2, 3 are completed.

It is understood that the structures formed on the radially inner side of the vertex of the rib 5, for example the straight flared tongues 13, the angled flared tongues 15, or the engaging nubs 20, may be combined with the features situated on the radially outer side of the rib 5, such as the claw tongues 29, the flared tongues 30, the ring retaining tongues 31, the axial tongues 34, or the rear engagement tongues 35, for modifications of the invention which are not illustrated, in order to achieve, over the entire diameter of devices according to the invention, good adhesion with the laminate cover layers 2, 3, and thus prefixing in the still dry state of the laminate cover layers 2, 3 and final anchoring in the laminate structure.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A device for anchoring at least one fastening element in a laminate structure, the at least one fastening element extending in a longitudinal direction, the laminate structure having at least two layers and a carrier assembly to which the at least one fastening element is connected, the at least one fastening element being formed as a cylindrical flared sleeve, the carrier assembly disposed between the at least two layers of the laminate structure, and the carrier assembly having a protruding rib structure disposed radially outwardly and circumferentially surrounding the at least one fastening element, wherein an upper layer of the at least two layers of the laminate structure covers and is in direct contact with an entire upper surface of the protruding rib structure and a lower layer of the at least two layers of the laminate structure covers and is in direct contact with an entire lower surface of the protruding rib structure.

2. The device of claim 1, wherein the rib structure includes a plurality of straight rib sections, the rib sections oriented at an angle relative to one another and extending in the circumferential direction.

3. The device of claim 1, wherein the rib structure surrounds the at least one fastening element in a circumferentially closed manner.

4. The device of claim 1, wherein the carrier assembly includes a reinforcing bevel on a radially outer side of the rib structure, the carrier assembly including an intermediate area adjoining the rib structure and an edge area disposed on a radially outer side of the intermediate area, the intermediate area and the edge area disposed in different planes.

5. The device of claim 1, wherein the carrier assembly includes a one-piece base plate.

6. The device of claim 1, wherein the at least one fastening element is one-piece formed with the carrier assembly.

7. The device of claim 1, wherein the at least one fastening element extends beyond a vertex of the protruding rib structure in an axial direction.

8. The device of claim 1, wherein the at least two layers cover the protruding rib structure of the carrier assembly.

9. A device for anchoring at least one fastening element in a laminate structure, the laminate structure having at least two layers and the at least one fastening element extending in a longitudinal direction, wherein the device comprises a carrier assembly to which the at least one fastening element is connected and the carrier assembly is disposed between the at least two layers of the laminate structure, and the carrier assembly having a protruding rib structure disposed radially outwardly and circumferentially surrounding the at least one fastening element, wherein an upper layer of the at least two layers of the laminate structure covers and is in direct contact with an entire upper surface of the protruding rib structure and a lower layer of the at least two layers of the laminate structure covers and is in direct contact with an entire lower surface of the protruding rib structure, wherein the at least one fastening element is one-piece formed with the carrier assembly.

10. The device of claim 9, wherein the at least one fastening element is formed as a cylindrical flared sleeve.

11. The device of claim 9, wherein the at least one fastening element extends beyond a vertex of the protruding rib structure in an axial direction.

12. The device of claim 9, wherein the rib structure includes a plurality of straight rib sections, the rib sections oriented at an angle relative to one another and extending in the circumferential direction.

13. The device of claim 9, wherein the rib structure surrounds the at least one fastening element in a circumferentially closed manner.

14. The device of claim 9, wherein the carrier assembly includes a reinforcing bevel on a radially outer side of the rib structure, the carrier assembly including an intermediate area adjoining the rib structure and an edge area disposed on a radially outer side of the intermediate area, the intermediate area and the edge area disposed in different planes.

15. A device for anchoring at least one fastening element in a laminate structure, the laminate structure having at least two layers and the at least one fastening element extending in a longitudinal direction, wherein the device comprises a carrier assembly to which the at least one fastening element is connected and the carrier assembly is disposed between the at least two layers of the laminate structure, and the at least two layers and the carrier assembly each having a protruding rib structure disposed radially outwardly and circumferentially surrounding the at least one fastening element, wherein an upper layer of the at least two layers of the laminate structure covers and is in direct contact with an entire upper surface of the protruding rib structure and a lower layer of the at least two layers of the laminate structure covers and is in direct contact with an entire lower surface of the protruding rib structure.

16. The device of claim 15, wherein the at least one fastening element is formed as a cylindrical flared sleeve.

17. The device of claim 15, wherein the at least one fastening element is one-piece formed with the carrier assembly.

18. The device of claim 15, wherein the rib structure surrounds the at least one fastening element in a circumferentially closed manner.

19. The device of claim 15, wherein the carrier assembly includes a reinforcing bevel on a radially outer side of the rib structure, the carrier assembly including an intermediate area adjoining the rib structure and an edge area disposed on a radially outer side of the intermediate area, the intermediate area and the edge area disposed in different planes.

* * * * *